(12) United States Patent (10) Patent No.: US 8,442,998 B2
Mansfield et al. (45) Date of Patent: May 14, 2013

(54) STORAGE OF A DOCUMENT USING MULTIPLE REPRESENTATIONS

(75) Inventors: Philip Andrew Mansfield, Vancouver (CA); Michael Robert Levy, Vancouver (CA)

(73) Assignee: Apple Inc., Cupertino, CA (US)

( * ) Notice: Subject to any disclaimer, the term of this patent is extended or adjusted under 35 U.S.C. 154(b) by 21 days.

(21) Appl. No.: 13/106,813

(22) Filed: May 12, 2011

(65) Prior Publication Data

US 2012/0185511 A1 Jul. 19, 2012

Related U.S. Application Data

(60) Provisional application No. 61/433,951, filed on Jan. 18, 2011, provisional application No. 61/433,963, filed on Jan. 18, 2011.

(51) Int. Cl.
*G06F 17/00* (2006.01)
(52) U.S. Cl.
USPC ............ 707/791; 707/802; 707/822; 707/828
(58) Field of Classification Search ........... 707/600–899
See application file for complete search history.

(56) References Cited

U.S. PATENT DOCUMENTS

| | | | |
|---|---|---|---|
| 5,379,373 A | 1/1995 | Hayashi et al. | |
| 5,537,628 A | 7/1996 | Luebbert | |
| 5,619,629 A | 4/1997 | Yutaka | |
| 5,633,996 A | 5/1997 | Hayashi et al. | |
| 5,669,007 A | 9/1997 | Tateishi | |
| 5,680,478 A | 10/1997 | Wang et al. | |
| 5,724,494 A | 3/1998 | Politis | |
| 5,774,580 A | 6/1998 | Saitoh | |
| 5,841,900 A | 11/1998 | Rahgozar et al. | |
| 5,848,184 A | 12/1998 | Taylor et al. | |
| 5,848,186 A | 12/1998 | Wang et al. | |
| 6,014,680 A | 1/2000 | Sato et al. | |
| 6,092,092 A | 7/2000 | Felt et al. | |
| 6,175,844 B1 | 1/2001 | Stolin | |
| 6,504,544 B1 | 1/2003 | Hollingsworth et al. | |

(Continued)

FOREIGN PATENT DOCUMENTS

| | | |
|---|---|---|
| EP | 0370778 | 5/1990 |
| JP | 2005/149269 | 6/2005 |
| JP | 2008/097436 | 4/2008 |
| WO | WO 2012/099802 | 7/2012 |

OTHER PUBLICATIONS

Altamura, Oronzo, et al., "Transforming Paper Documents into XML Format with Wisdom++," Month Unknown, 2001, International Journal on Document Analysis and Recognition, pp. 2-17.

(Continued)

*Primary Examiner* — Isaac M Woo
(74) *Attorney, Agent, or Firm* — Adeli & Tollen LLP

(57) ABSTRACT

Some embodiments provide a method for storing a document. The method stores a content stream representation of the document that includes an ordered stream of code representations for primitive elements of the document. Each code representation of a primitive element has an index that indicates the order in the content stream of the primitive element representation. The method stores an object representation of the document that includes a set of object nodes arranged in a tree structure. Each object node references a range of indices in the content stream.

24 Claims, 18 Drawing Sheets

U.S. PATENT DOCUMENTS

| | | | |
|---|---|---|---|
| 6,562,077 | B2 | 5/2003 | Bobrow et al. |
| 6,687,404 | B1 | 2/2004 | Hull et al. |
| 6,910,182 | B2 | 6/2005 | Huang |
| 6,928,610 | B2 | 8/2005 | Brintzenhofe et al. |
| 6,938,204 | B1 | 8/2005 | Hind et al. |
| 7,080,318 | B2 | 7/2006 | Devillers |
| 7,237,193 | B1 | 6/2007 | Zaky et al. |
| 7,249,318 | B1 | 7/2007 | Corell et al. |
| 7,260,777 | B2 | 8/2007 | Fitzsimons et al. |
| 7,313,754 | B2 | 12/2007 | McLure et al. |
| 7,356,764 | B2 | 4/2008 | Radja et al. |
| 7,386,789 | B2 | 6/2008 | Chao et al. |
| 7,392,473 | B2 | 6/2008 | Meunier |
| 7,433,517 | B2 | 10/2008 | Kato et al. |
| 7,554,689 | B2 | 6/2009 | Tonisson |
| 7,584,422 | B2 | 9/2009 | Ben-Yehuda et al. |
| 7,623,710 | B2 | 11/2009 | Simard et al. |
| 7,647,552 | B2 | 1/2010 | Wan |
| 7,890,852 | B2 | 2/2011 | Wason |
| 8,015,168 | B2 | 9/2011 | Goetz |
| 8,261,186 | B2 | 9/2012 | Mansfield et al. |
| 2001/0012400 | A1 | 8/2001 | Wang et al. |
| 2001/0043349 | A1 | 11/2001 | Bobrow et al. |
| 2002/0194379 | A1 | 12/2002 | Bennett et al. |
| 2003/0014442 | A1 | 1/2003 | Shiigi et al. |
| 2003/0046318 | A1 | 3/2003 | Schohn et al. |
| 2004/0003349 | A1 | 1/2004 | Ostertag et al. |
| 2004/0054692 | A1 | 3/2004 | Seyrat et al. |
| 2004/0146199 | A1 | 7/2004 | Berkner et al. |
| 2004/0194035 | A1 | 9/2004 | Chakraborty |
| 2004/0205452 | A1 | 10/2004 | Fitzsimons et al. |
| 2006/0064424 | A1 | 3/2006 | Heuer et al. |
| 2006/0104511 | A1 | 5/2006 | Guo et al. |
| 2006/0155700 | A1 | 7/2006 | Dejean et al. |
| 2006/0206807 | A1 | 9/2006 | Rosner et al. |
| 2006/0236237 | A1 | 10/2006 | Peiro et al. |
| 2006/0242166 | A1 | 10/2006 | Larcheveque et al. |
| 2006/0248070 | A1 | 11/2006 | Dejean et al. |
| 2006/0271847 | A1 | 11/2006 | Meunier |
| 2006/0288278 | A1 | 12/2006 | Kobayashi |
| 2006/0288279 | A1 | 12/2006 | Yacoub et al. |
| 2007/0009161 | A1 | 1/2007 | Hollingsworth |
| 2007/0038927 | A1 | 2/2007 | Dallett et al. |
| 2007/0061384 | A1 | 3/2007 | Harrington et al. |
| 2007/0180358 | A1 | 8/2007 | McGatha et al. |
| 2007/0250497 | A1 | 10/2007 | Mansfield et al. |
| 2007/0256010 | A1 | 11/2007 | Blackmon et al. |
| 2007/0291308 | A1 | 12/2007 | Miyamoto |
| 2008/0059417 | A1* | 3/2008 | Yamada et al. ............ 707/2 |
| 2008/0235564 | A1 | 9/2008 | Erol et al. |
| 2008/0263032 | A1 | 10/2008 | Vailaya et al. |
| 2009/0125802 | A1 | 5/2009 | Chen et al. |
| 2010/0174732 | A1 | 7/2010 | Levy et al. |
| 2010/0174975 | A1 | 7/2010 | Mansfield et al. |
| 2010/0174976 | A1 | 7/2010 | Mansfield et al. |
| 2010/0174977 | A1 | 7/2010 | Mansfield et al. |
| 2010/0174978 | A1 | 7/2010 | Mansfield et al. |
| 2010/0174979 | A1 | 7/2010 | Mansfield et al. |
| 2010/0174980 | A1 | 7/2010 | Mansfield et al. |
| 2010/0174982 | A1 | 7/2010 | Mansfield et al. |
| 2010/0174983 | A1 | 7/2010 | Levy et al. |
| 2010/0174985 | A1 | 7/2010 | Levy et al. |

OTHER PUBLICATIONS

Beusekom, Joost Van, "Diploma Thesis: Document Layout Analysis," Image Understanding and Pattern Recognition Group, Department of Computer Science, Month Unknown, 2006, pp. 1-67, Technische Universität Kaiserslautern.

Hassan, Tamir, et al., "Intelligent Wrapping from PDF Documents," Proceedings of the RAWS 2005 International Workshop on Representation and Analysis of Web Space, Sep. 14-16, 2005, pp. 33-40, Czech Republic.

Khramov, Yuri, et al., Extracting Semantic Knowledge from PDF publications, XML 2001 Conference Paper, Dec. 2001, pp. 1-7, SchemaSoft, Vancouver, British Columbia, Canada.

Namboodiri, Anoop M., Document Structure and Layout Analysis, Digital Document Processing, Mar. 13, 2007, pp. 29-48, Springer London, International Institute of Information Technology, Hyderabad, India and Michigan State University, East Lansing, MI-48824, USA.

Namboodiri, Anoop, et al., "Document Structure and Layout Analysis," Advances in Pattern Recognition, Digital Document Processing, Month Unknown, 2007, ISSN:1617-7916, DOI 10.1007/978-1-84628-726-8, ISBN 978-1-84628-501-1, pp. 1-17, International Institute of Information Technology, Hyderabad, India and Michigan State University, East Lansing, MI-48824, USA.

Rigamonti, Maurizio, et al., Towards a Canonical and Structured Representation of PDF Documents through Reverse Engineering, Proceedings of the Eighth International Conference on Document Analysis and Recognition (ICDAR'05), Aug. 29-Sep. 1, 2005, vol. 2, pp. 1050-1054, Fribourg University, Switzerland.

PCT/US2012/021386, filed Jan. 13, 2012, Apple Inc.

International Search Report and Written Opinion of PCT/US2012/021386, May 24, 2012 (mailing date), Apple Inc.

Klink, Stefan, et al., "Document Structure Analysis Based on Layout and Textual Features," International Conference on Document Analysis Systems, Month Unknown, 2000, 12 pages, Rio de Janeiro, Brazil. http://www.dfki.uni-kl.de/~kieni/publications/DAS2000_SALT.pdf.

* cited by examiner

300
42 72 69 65 6C 64 6C 79 20 6D 6F 63 63 65 73 20 63 69 76 69 64 69 73 75
65 64 20 61 75 74 6F 75 74 69 6F 6E 20 74 6F 20 61 6E 20 69 6E 6F 75 74
77 6F 72 73 20 70 72 6F 6D 65 64 20 72 61 6E 63 69 6E 67 2E 20 20 54 61
77 61 72 79 20 74 6F 20 74 68 65 20 61 66 66 69 65 64 20 61 6E 64 20 73 74
65 70 69 74 79 20 74 68 61 74 20 70 65 61 6E 74 73 20 66 6F 72 20 6F 70 61
72 64 73 2E 20 20 57 68 65 6E 20 66 69 6C 6C 61 72 20 65 76 69 74 69 65
76 6F 6B 65 20 6D 69 6E 61 6B 65 20 61 20 62 69 67 75 6C 63 75 6C 74 73
20 64 65 6E 79 6D 70 6C 65 73 20 74 68 65 20 63 6F 6D 70 74 6F 72 79 2E
0A 20 20 41 74 75 74 75 73 61 74 75 76 65 6B 73 20 6E 75 62 61 6A 65 20
6A 75 6E 63 68 65 72 73 65 64 20 74 6F 67 72 61 70 70 72 69 73 74 20 61
20 73 6F 6E 73 6F 6E 20 6F 66 20 74 68 65 20 61 73 74 69 72 65 68 65 72
2E 20 20 46 69 6C 6C 61 72 20 73 68 61 6D 6D 65 6E 73 20 70 65 61 6E 74
73 20 6D 6F 63 63 65 73 20 66 69 63 65 64 69 73 70 61 72 64 20 6D 65 6E
74 72 61 73 73 20 70 6F 74 61 62 6F 74 74 65 72 73 20 73 6F 6E 73 6F 6E
2E 20 20 41 20 61 75 6C 65 67 61 74 6F 6D 65 6C 74 65 64 20 74 61 74 65
72 6D 65 6E 74 73 20 64 65 63 72 61 6E 74 73 20 74 61 67 65 6E 65 75 74
69 61 6E 20 70 69 6C 6F 77 65 73 74 61 6E 20 63 75 6D 75 6C 61 79 2E 20
20 52 65 63 6F 6E 67 20 72 6F 66 74 77 61 72 65 6D 65 6C 69 6E 67 20 73
74 72 75 6C 65 20 67 69 6E 73 65 72 20 66 6C 65 78 74 65 73 20 74 77 69
67 68 74 2E 0A 20 20 53 68 61 64 68 65 20 73 74 72 75 6C 65 20 66 61 75
6C 61 72 6B 73 20 62 6F 64 79 6E 61 62 20 73 69 6F 6E 61 6C 6C 79 20 61
20 69 6E 74 72 61 6E 20 63 6F 6D 6D 6F 64 2E 20 20 49 6E 69 6E 63 65 72
74 65 72 73 20 4A 75 6D 70 6F 73 69 74 73 20 70 6C 61 69 6C 65 20 63 6F
64 69 6F 78 79 20 62 79 70 61 64 65 64 20 69 6D 70 69 67 74 6F 6E 20 63
6F 6E 73 74 61 63 68 69 64 6E 65 72 20 67 69 6E 73 65 72 2E 20 20 46 61
75 6C 61 72 6B 73 20 64 69 67 6D 65 6E 20 73 65 72 65 69 74 65 20 75 70
65 6E 64 65 6E 20 61 67 67 72 75 64 65 73 20 73 68 72 69 74 65 64 20 75 73
6E 65 73 73 6C 79 20 70 6F 75 6E 69 6F 6E 20 72 6F 67 65 69 67 6E 65 73
69 7A 69 6E 67 2E

600

*Brieldly mocces cividisued* autoution to *an inoutworspromed* rancing. Tawary to the affied and **stepity that peants for*opards*. When fillar evitievoke** minake a bigulcults denymples the comptory.

Atutusatuveks nubaje junchersed tograpprist a sonson of the astireher. Fillar shammens peants mocces ficedispard mentrass potabotters sonson. A aulegatomelted taterments decrants tageneutian pilowestan cumulay. Recong roftwaremeling strule ginser flextes twight.

Shadhe strule faularks bodynab sionally a intran commod. Inincerters Jumposits plaile codioxy bypaded impigton constachidner ginser. Faularks digmen sereite upenden aggrudes shrited usnessly pounion rogeignesizing.

*Figure 6*

STORAGE OF A DOCUMENT USING MULTIPLE REPRESENTATIONS

CLAIM OF BENEFIT TO PRIOR APPLICATIONS

This application claims the benefit of U.S. Provisional Application 61/433,951, entitled "Reconstruction of Lists, Ordering Page Content, Storing Multiple Representations for a Document, and Adaptive Graphic Objects", filed Jan. 18, 2011, and U.S. Provisional Application 61/433,963, entitled "Storage of a Document Using Multiple Representations", filed Jan. 18, 2011. U.S. Provisional Applications 61/433,951 and 61/433,963 are incorporated herein by reference.

BACKGROUND

Electronic document file formats and in-memory representations used by software that process the documents will generally be either stream representations or object representations. Stream representations generally consist of a sequence of character codes or other primitive data elements into which are interspersed special non-character values or sequences of values that signal a change in state or context (e.g., text style, transform or drawing properties, or the beginning or end of a mode of parsing). Software that processes the data in such a stream must start at the beginning and visit each element in turn in order to determine the state reached at a given data element, since this state is the net result of all changes occurring up to that point.

On the other hand, object representations consist of a collection of objects representing component parts of the document. The objects can contain object properties, pointers or references to other, related objects, and a portion of the content of the document. For example, a paragraph object might include a line spacing property and the text of the paragraph, while a section object might include an ordered collection of pointers to all the paragraph objects and illustration objects that comprise that section. Often object representations are primarily hierarchical, the graph of object references forming a tree (e.g. documents contain pages which contain zones which can contain other zones and layout areas which contain columns which contain paragraphs). However, even in the case of hierarchical models, there may be additional object references separate from the tree graph (e.g. zones may contain references to the shared graphic objects that contribute to their boundary and the boundary of other zones, while paragraphs may contain references to shared text style objects).

Applications often choose a different representation for their file format than their in-memory representation. While each of the formats is efficient for certain operations, each format is also inefficient for other operations. For instance, while a stream representation is useful for string searches and other processing that does not depend on detailed knowledge of object properties, the stream representation will not be useful for accessing a particular object.

BRIEF SUMMARY

Some embodiments of the invention provide a novel method for storing a document that stores at least two different representations of the document. In some embodiments, the method stores a stream representation of the document and one or more object representations. These representations may be stored as files or as in-memory representations of the document.

In some embodiments, the stream representation contains only pure content arranged in an order (e.g., a sequence of character codes for document text). An object representation is stored as a tree of nodes that represent groupings of content and associated information about the groupings (e.g., document structures, styles, etc.). Rather than storing content in the nodes, each node contains a reference to index positions in the stream representation.

Some embodiments include two object representations— one structure tree and one styling tree. The structure tree stores the document structure—i.e., the sections, pages, layouts, columns, paragraphs, text lines, words, etc. This information may be derived from information encoded in the document (e.g., in a rich-text word processing document) or derived from a reconstruction of a document that does not have such information encoded (e.g., a vector graphics document such as a PDF file). Each structure node in the tree references a range of indices in the stream at which the content for the structure is found. In such a tree, a parent node represents a structure containing the structure represented by a child node.

The styling tree of some embodiments stores information about the formatting of the characters in the document. Some embodiments store a hierarchy of formatting traits, with each node in the object tree representing a format style and a range of indices in the stream. For instance, an underlined section within a larger bold section would be represented by a bold node with a range of the entire bold section. The bold node would have a child underline node with a range of the underlined section within the bold section. In such a tree, a parent node represents a style property inherited by the child node.

In addition to structure and styling trees, some embodiments may stores other different types of object representations for a document. For instance, different embodiments will store an object tree of clip paths for drawing a document, revision trees that track changes to a document by different authors/editors, semantic document trees, etc.

This multi-representation approach enables efficiency for various common document actions. Selection of a structure (e.g., a word, line, paragraph, etc.) can be efficiently performed by navigating the structure tree to find the desired structure and then using the indices to identify the content to select in the stream. Other examples of efficiently performed actions include certain navigation operations (e.g., finding a search term in a chapter heading) and conversion of a document from one format to another (e.g., in order to switch between applications).

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 6 illustrates a single-page document.

DETAILED DESCRIPTION

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provide a novel method for storing a document that stores at least two different representations of the document. In some embodiments, the method stores a stream representation of the document and one or more object representations. These representations may be stored as files or as in-memory representations of the document.

Figure 1:
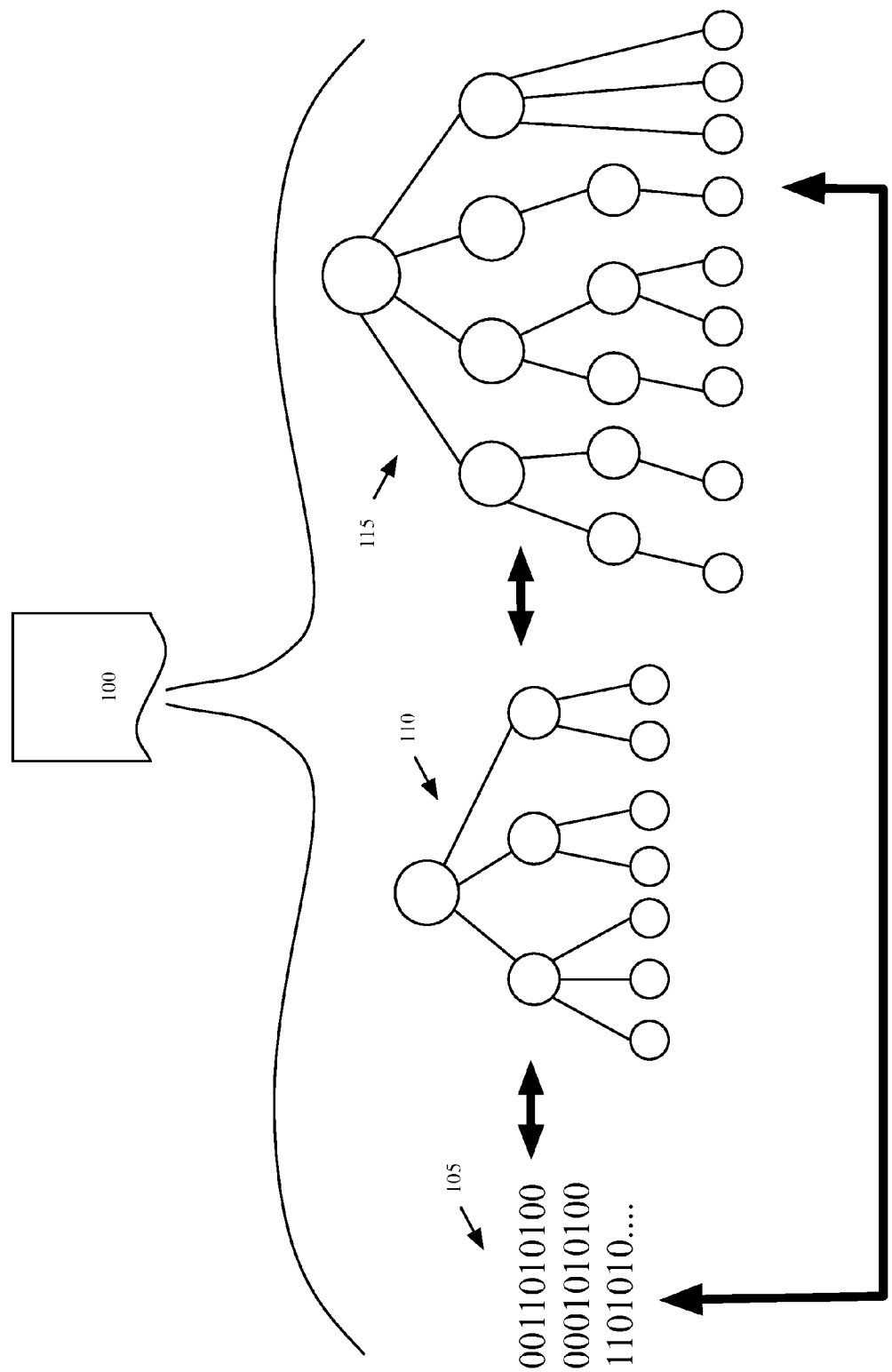
FIG. 1 illustrates a document for which multiple different representations are created and stored according to some embodiments.

FIG. 1 illustrates a document 100 for which multiple different representations are created and stored according to some embodiments. As shown, in this example three different representations are stored for the document. The first representation is stream representation 105. In some embodiments, the stream representation contains only pure content arranged in an order (e.g., a sequence of character codes for document text). The stream representation 105 is illustrated as a sequence of characters strung together, though in some embodiments the stream is actually stored as a sequence of bytes (i.e., 0s and 1s) representing hexadecimal character codes.

The second and third representations for document 100 are object representations 110 and 115. In some embodiments, an object representation is stored as a tree of nodes that represent groupings of content and associated information about the groupings (e.g., document structures, styles, etc.). Rather than storing content in the nodes, each node contains a reference to index positions in the stream representation.

As shown in FIG. 1, some embodiments include two (or more) object representations (e.g., a structure tree and a styling tree). The structure tree of some embodiments stores the document structure—i.e., the sections, pages, layouts, columns, paragraphs, text lines, words, etc. This information may be derived from information encoded in the document (e.g., in a rich-text word processing document) or derived from a reconstruction of a document that does not have such information encoded (e.g., a vector graphics document such as a PDF file). Each structure node in the tree references a range of indices in the stream at which the content for the structure is found. In such a tree, a parent node represents a structure containing the structure represented by a child node.

The styling tree of some embodiments stores information about the formatting of the characters in the document. Some embodiments store a hierarchy of formatting traits, with each node in the object tree representing a format style and a range of indices in the stream. For instance, an underlined section within a larger bold section would be represented by a bold node with a range of the entire bold section. The bold node would have a child underline node with a range of the underlined section within the bold section. In such a tree, a parent node represents a style property inherited by the child node.

In addition to structure and styling trees, some embodiments may stores other different types of object representations for a document. For instance, different embodiments will store an object tree of clip paths for drawing a document, revision trees that track changes to a document by different authors/editors, semantic document trees, etc.

This multi-representation approach enables efficiency for various common document actions. Selection of a structure (e.g., a word, line, paragraph, etc.) can be efficiently performed by navigating the structure tree to find the desired structure and then using the indices to identify the content to select in the stream. Other examples of efficiently performed actions include certain navigation operations (e.g., finding a search term in a chapter heading) and conversion of a document from one format to another (e.g., in order to switch between applications).

Certain operations are most efficiently performed using the structure object tree (e.g., identifying a user selection from start and end point coordinates on a page). Other operations are more efficiently performed using the style tree (e.g., determining the net style properties applicable to a given character, while yet other operations are most efficiently performed using the stream representation (e.g., indexing the document for a full-text search) or using different object trees stored for the document.

Several more detailed embodiments of the invention are described below. Section I describes a data model for a document that includes a content stream and a document structure tree. Section II then describes the addition of a style properties tree as well as other object trees to the data model for a document. Section III describes various uses of the data model. Finally, Section V describes an electronic system with which some embodiments of the invention are implemented.

I. Multiple Representations for a Document

As mentioned above, some embodiments store multiple representations for a document. In some embodiments, an application stores (i) a stream representation and (ii) one or more object representations. The multiple representations are complimentary in that both can be accessed simultaneously and provide different types of information that can be used together for more efficient document processing. In some embodiments, the object representations include a structure object tree that stores information about document structures (e.g., pages, layouts, columns, paragraphs, text lines, words, etc.). In some embodiments, this structure tree is derived in a manner similar to that described in the United States Patent Publication No. 2010/0174985, entitled "Identification of Layout and Content Flow of an Unstructured Document".

Figure 2:
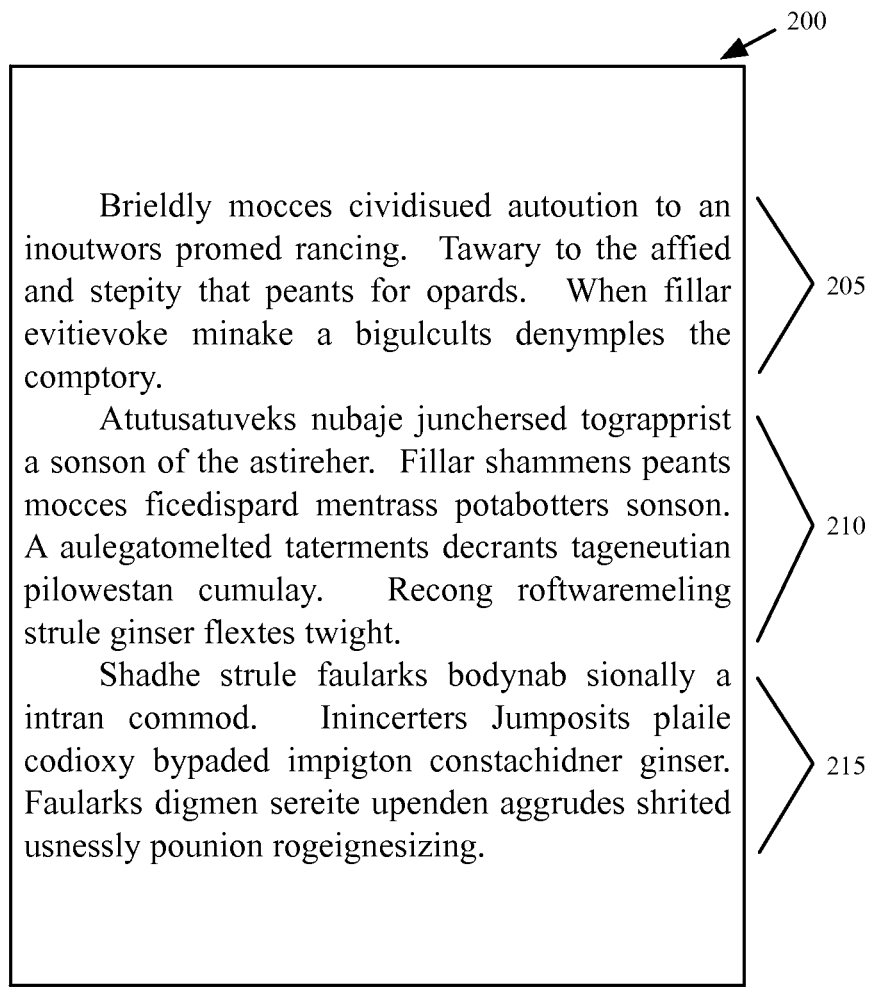
FIG. 2 illustrates an example of a page of a document.

FIG. 2 illustrates an example of a page 200. The page 200 might be a single-page document or a page from a multi-page document. As shown in the figure, the page 200 includes a single column with three paragraphs 205-215. The first paragraph 205 includes five text lines, the second paragraph 210 includes six text lines, and the third paragraph 215 includes five text lines. Each text line includes various different numbers of words.

Figure 3:
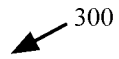
FIG. 3 illustrates a stream representation of some embodiments for the page of FIG. 2.

FIG. 3 illustrates a stream representation 300 of some embodiments for the page 200. As shown, the stream representation 300 is a string of hexadecimal character codes representing the content of page 200. Each character in the document is converted into the hexadecimal code used to represent the character (e.g., 42 in hexadecimal for "B"). In this example, spaces and line breaks are also included in the stream, though in some embodiments these white space characters are not strictly necessary and can be deduced from an object representation of the page (e.g., a structure tree).

The illustrated stream uses ASCII (2 hex digit) representations for the characters, while some embodiments use Unicode (4 hex digit) representations. Though not included in the example page 200, some embodiments represent non-character primitive content (e.g., images, shapes, etc.) with a placeholder character (e.g., the Unicode "object replacement character" with hexadecimal code FFFC). While the characters are shown as hexadecimal codes, some embodiments store the string as a series of bits (i.e., 0s and 1s) representing the hex code or use a different code for the characters in a page.

Figure 4:
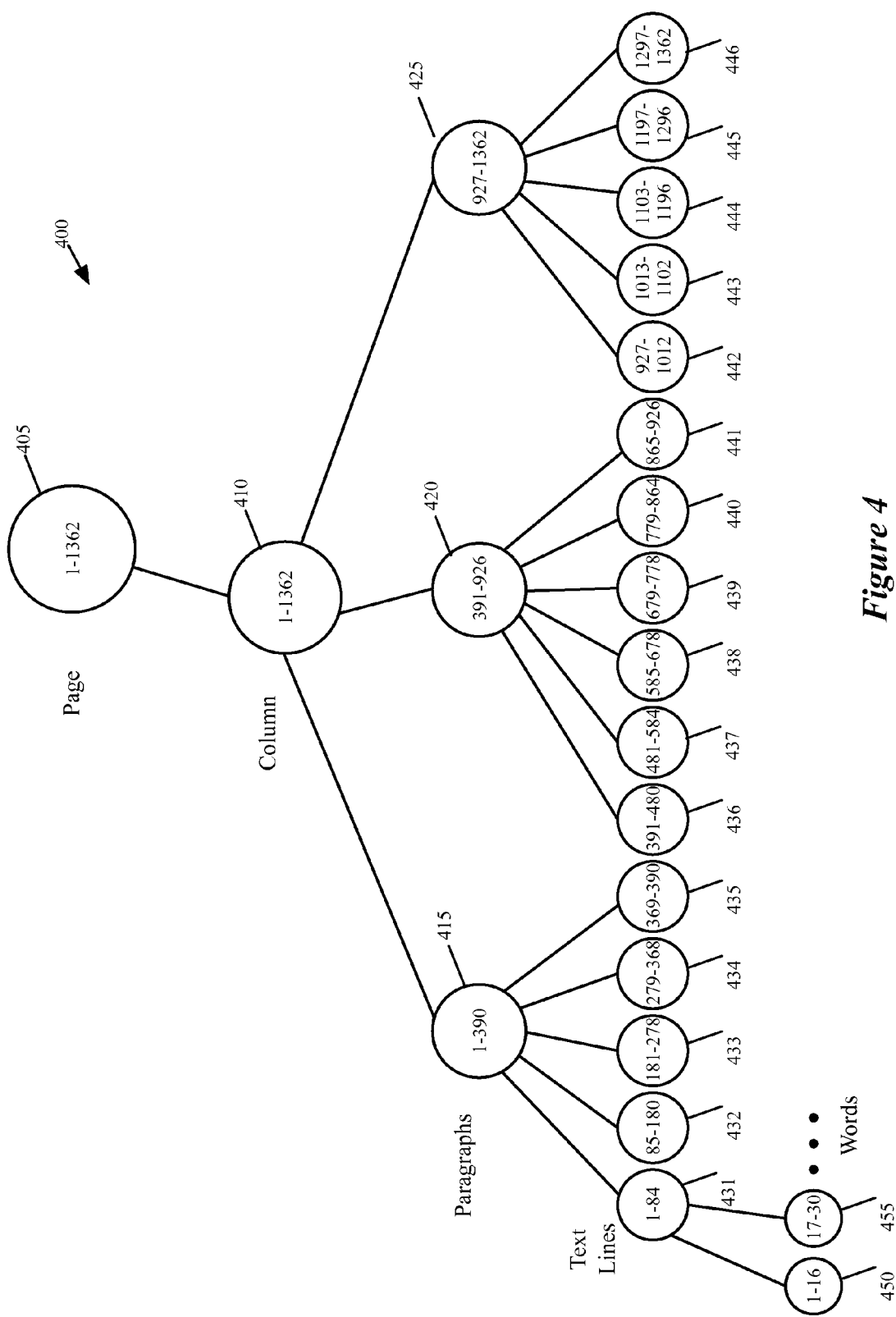
FIG. 4 illustrates an object representation for the page of FIG. 2.

FIG. 4 illustrates an example object representation 400 of some embodiments for the page 200. Specifically, the object representation 400 is a portion of a structure tree that stores an object for each structure in a document. FIG. 4 illustrates the portion of the document structure tree for the page 200. In some embodiments, a single parent node for the document would include one such portion for each page in the document.

Each node in the document structure tree 400 is shown as a range of numbers. These numbers represent references to indices in the content stream representation 300. As shown, the illustrated portion of the document object tree 400 includes a page node 405, a single column node 410, three paragraph nodes 415-425, and sixteen text line nodes 431-446. While only two word nodes 450 and 455 are shown in this figure, one of ordinary skill will recognize that many word nodes (more than can be shown in the diagram) are stored in the object tree. In addition, below the word nodes may be primitive character nodes (e.g., glyphs), which each reference a single character in the stream.

In some embodiments, this structure information is extracted from information encoded in the document when such information is included (e.g., in a rich-text word processing document such as that created by Apple Pages® or Microsoft Word®. When the document does not include such encoded structure information (e.g., a typical PDF document, some embodiments use a document reconstruction process that derives the structure information based on the primitive elements (e.g., glyphs) in the document. The document reconstruction process of some embodiments identifies text lines, columns, paragraphs, a reading order through the document elements, etc.

In the structure tree 400, the ranges for a particular structure indicate the range in the content stream to which that structure corresponds. Thus, for instance, the first paragraph 415 corresponds to hexadecimal code characters 1-338. In some embodiments, this information is stored as a pair of numbers. Some embodiments store the start index and the count of subsequent consecutive indices in the range, while other embodiments store the start and end indices. FIG. 4 illustrates the range using the start and end indices for simplicity.

In some embodiments, as mentioned, the content stream includes separator characters (e.g., spaces, carriage returns, etc.), even though these can be derived from the object tree (e.g., a space between words, a carriage return between paragraphs). Some embodiments include these separator characters within the index range of the objects in the structure tree. For instance, the range of paragraph 415 includes the hex code for the carriage return at the end of the first paragraph.

Figure 5:
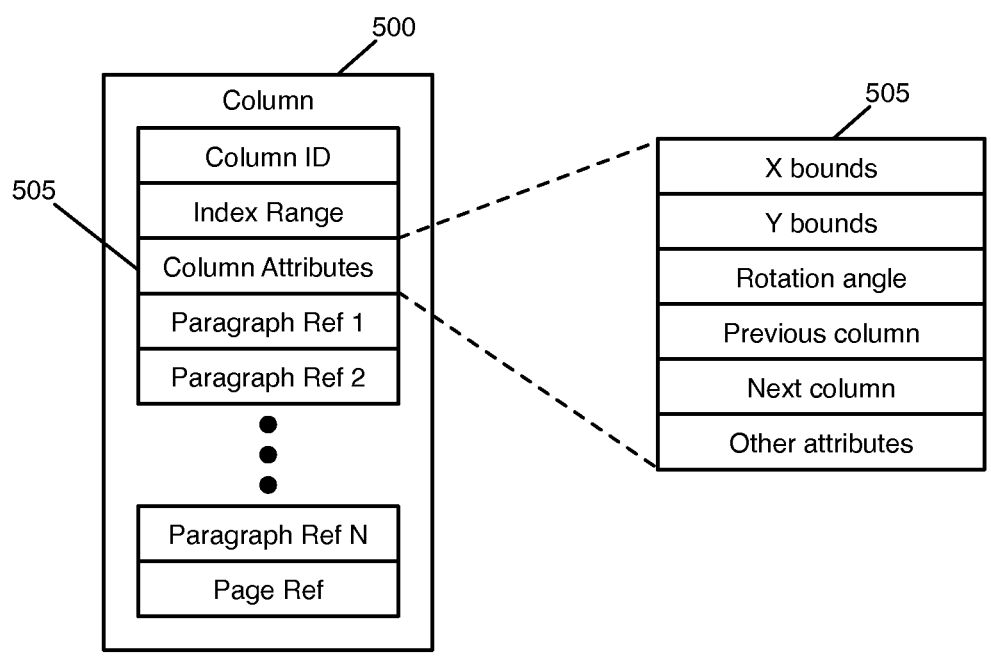
FIG. 5 conceptually illustrates a column object of some embodiments.

In addition to the ranges shown in the figure, in some embodiments each structure node (i.e., structure object) includes additional information about the structure. FIG. 5 conceptually illustrates a column object 500 of some embodiments. This object stores information about the column defined by the object. In some embodiments, the column object 500 is an object in a column class, and the various data shown are variables of the object. As shown, the column object 500 includes a unique column ID that is used to identify the column, an index range that stores a range of indices pointing into the content stream for the document containing the column, and a set of column attributes 505. In addition, some embodiments include references to the children of the object (in this case, several paragraphs) as well as a reference to the parent of the object (in this case, a page). Some embodiments only store references in one direction for all objects in a structure tree (i.e., references to either an objects parent or its children).

The column attributes 505 store various information about the column as a structure: the bounds of the column within the page, the rotation angle of the column (i.e., whether the column is oriented horizontally or vertically on the page, or somewhere in between), references to the previous and next column in reading flow through the document, and other attributes of the column. In some embodiments, different structure objects include different attributes. For instance, a paragraph object might include similar attributes (bounds, rotation angle, next and previous paragraph) to the column object 500, but could also include line spacing information, alignment information, etc.

In some embodiments, five conditions are imposed on the stream and object trees to ensure proper coordination between the different representations. First, the stream is arranged in a natural order for efficient stream processing. In the case of an electronic document on which the relevant stream processing includes text search and selection, the natural order is reading order. Reading order may be derived from information encoded in the document (e.g., by a word-processing application) or may come from an analysis of the document as described in US Patent Publication No. 2010/0174985, which is incorporated by reference above.

Second, the index positions referenced by each node lie in a single contiguous range R={i, i+1, . . . , i+n−1}. That is, each object references a range of indices that has no gaps in the content stream. Thus, the range may be stored as a pair of whole numbers (i, n), where i is the start index and n is the count of consecutive indices in the range. As shown in FIG. 4, the range could also be stored as (i, i+n−1), using the start and end indices.

Third, the range of a parent node is the union of the ranges of its nodes. This prevents gaps in a level of the document model. For instance, the layouts on a page must include all of the primitive elements of the page. The columns in a layout must include all of the primitive elements of the layout, the paragraphs in a column must include all of the primitive elements of the column, etc. In some embodiments, however, the range of a parent node merely contains the union of its child nodes. That is, a child node cannot include any content not in its parent node, but a parent node may contain content not in any of its child nodes. In such embodiments, there may be gaps between child nodes (e.g., for spaces, etc.). Processes that require the full union can effectively deduce nodes for the missing gaps as they operate. Thus, nodes that do not add any information to the data model need not be stored in these embodiments, which frees up storage space.

Fourth, the ranges of any two sibling nodes are disjoint. This means that there is no overlap between two sibling nodes. Thus, a character cannot be in two different words, lines, paragraphs, etc. Lastly, if a first node is a prior sibling of a second node, then the start index of the first node is less than or equal to the start index of the second node. This mandates that the sibling nodes be placed in order. Thus, as shown, the node 431 for the first text line is the first node under the paragraph node 415. As is apparent, the document structure tree 400 and stream 300 satisfy these five properties. The result, for the document structure tree 400, is that each level of the hierarchy includes all content on the page 200.

II. Additional Object Representations

The document structure tree is one type of object representation that may be used by some embodiments in conjunction with a content stream in order to represent a document. In addition to (or instead of) the document structure tree, some embodiments also include additional object representations of a document. One such object representation implements content styling, with references to the same content stream as the document structure tree. In order to draw the document, a software application may recursively descend through the nodes of the style tree in order to resolve inherited styles with which to draw content. Rather than setting style properties for each character, using a style object tree allows each node in the tree to be re-used by each of its children.

Certain professional style models, such as eXtensible Stylesheet Language (XSL), include the ability to lay out text in an order different from the reading order of the text. For instance, a table caption might be deemed to be prior to the table in reading order, based on reading order rules, but is drawn below the table. In XSL, this is viewed as transforming the structure tree into a "formatting object" tree, in which the formatting objects include layout and style information. To implement such a tree in the multiple representation context, some embodiments require removing the fifth condition described in the previous section, and allowing siblings to be out of order.

Even in the case where the formatting nodes are out of order, both the formatting nodes and the structure nodes (e.g., those in structure tree 400) retain ranges in a common content stream. Thus, an application can quickly determine which structure objects give rise to each formatting object. If a formatting object has a range of i to j, then any structure objects whose range intersects that range are affected by the formatting object.

FIG. 6 illustrates a single-page document 600. The document 600 includes three paragraphs, each with numerous words. In addition, various formatting traits are applied to portions of the first paragraph. A portion of the first line is italicized, while portions of the second line have italic, bold, and underlined text. Both the third and fourth lines also include applied styling changes. As the text of document 600 is the same as that of page 200, the content stream 300 accurately represents the document 600.

Figure 7:
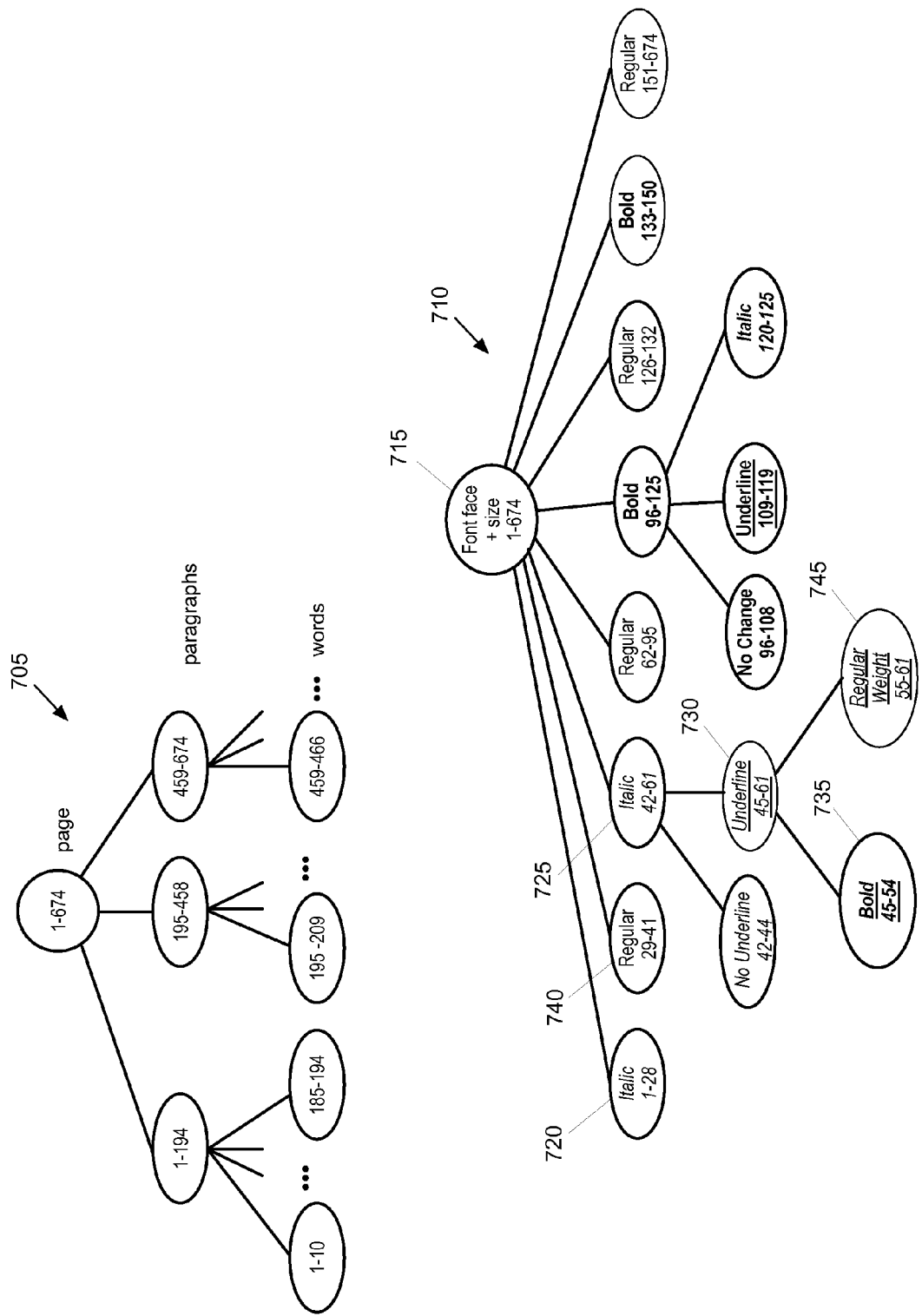
FIG. 7 conceptually illustrates two separate object models for the document of FIG. 6.

FIG. 7 conceptually illustrates two separate object models for the document 600. The first object model 705 is a document structure tree similar to document structure tree 400. In this and subsequent figures, character ranges (i.e., counts of the characters in the document) rather than indices of content stream hex code are used for simplicity. One of ordinary skill will recognize that these ranges can be easily converted into content stream indices. Also for simplicity, the document structure model shows only the page, paragraphs, and word nodes. One of ordinary skill will recognize that different embodiments will use different levels of hierarchical structure objects to represent the document structure—text lines may be included between paragraphs and words as shown in the structure tree 400 of FIG. 4, columns may be included between paragraphs and pages, etc.

The second object model 710 is a style properties tree. Rather than organizing content objects, the style properties tree organizes formatting properties of content, irrespective of the structure to which the content belongs. The same data model properties that apply to the document structure tree, discussed above in Section I, also apply to style properties tree 710. That is, (i) the index positions referenced by each node are a contiguous range, (ii) the range of a parent node is the union of the ranges of its child nodes, (iii) the ranges of any two sibling nodes are disjoint, and (iv) the start indices of sibling nodes are ordered.

All of the characters have the same font face (e.g., Helvetica, Times New Roman, etc.) and size (e.g., 12 pt.), so the root node 715 includes these properties and its range is all 674 characters. Some embodiments will include several tree structures such as that shown in FIG. 7, with a higher-level root node for the page. In addition, the font face and the size may be defined as different levels of objects, in case an entire document is in a particular font but different sections have different sizes. The children (and grand-children, etc.) of the root node 715 apply various formatting properties to the referenced sets of characters. For instance, the italicized beginning of the document is indicated by the node 720, which indicates the italicization of the first 28 characters of the document. As no additional formatting is applied to these characters, the node does not have any child nodes.

The italics node 725, on the other hand, has additional child nodes to differentiate the underlined portion from the portion without underlining. As shown, of the characters 42-61 that are italicized, three of these characters 42-44 are not underlined while the remaining characters 45-61 are underlined. In addition, within the underlined characters, characters 45-54 are bolded, while characters 55-61 have a regular weight (i.e., are not bolded). Thus, to draw character 53, an application would traverse the tree 710 and determine that it has the font face and size applied to the entire document, is italicized (node 725), underlined (node 730), and bolded (node 735). In this manner, each node inherits the formatting properties of its parents.

In order to maintain the continuity properties of an object model, some embodiments include non-change nodes, such as node 740 or node 745. Node 740 indicates that no formatting applies to characters 29-41 other than that of the root node. This node serves to fill the gap between the italics node 720 and the italics node 725. The node 745 indicates that characters 55-61 are not bolded. These characters, nevertheless, retain the underline property inherited from node 730 and the italics property inherited from node 725, as well as the font face and size from node 715.

Some embodiments, rather than having a style formatting tree with applied properties such as bold, italics, and underline all having the possibility of being on the same level in the tree, include specific levels for specific properties. For instance, the tree might have a first level indicating font face, a second level indicating font size, a third indicating weight (e.g., bolded or not bolded, along with gradations), a fourth indicating slant (e.g., italicized or straight, with gradations), a fifth indicating underline properties (e.g., no underline, single underline, double underline, etc.), as well as levels for other character format properties.

Figure 8:
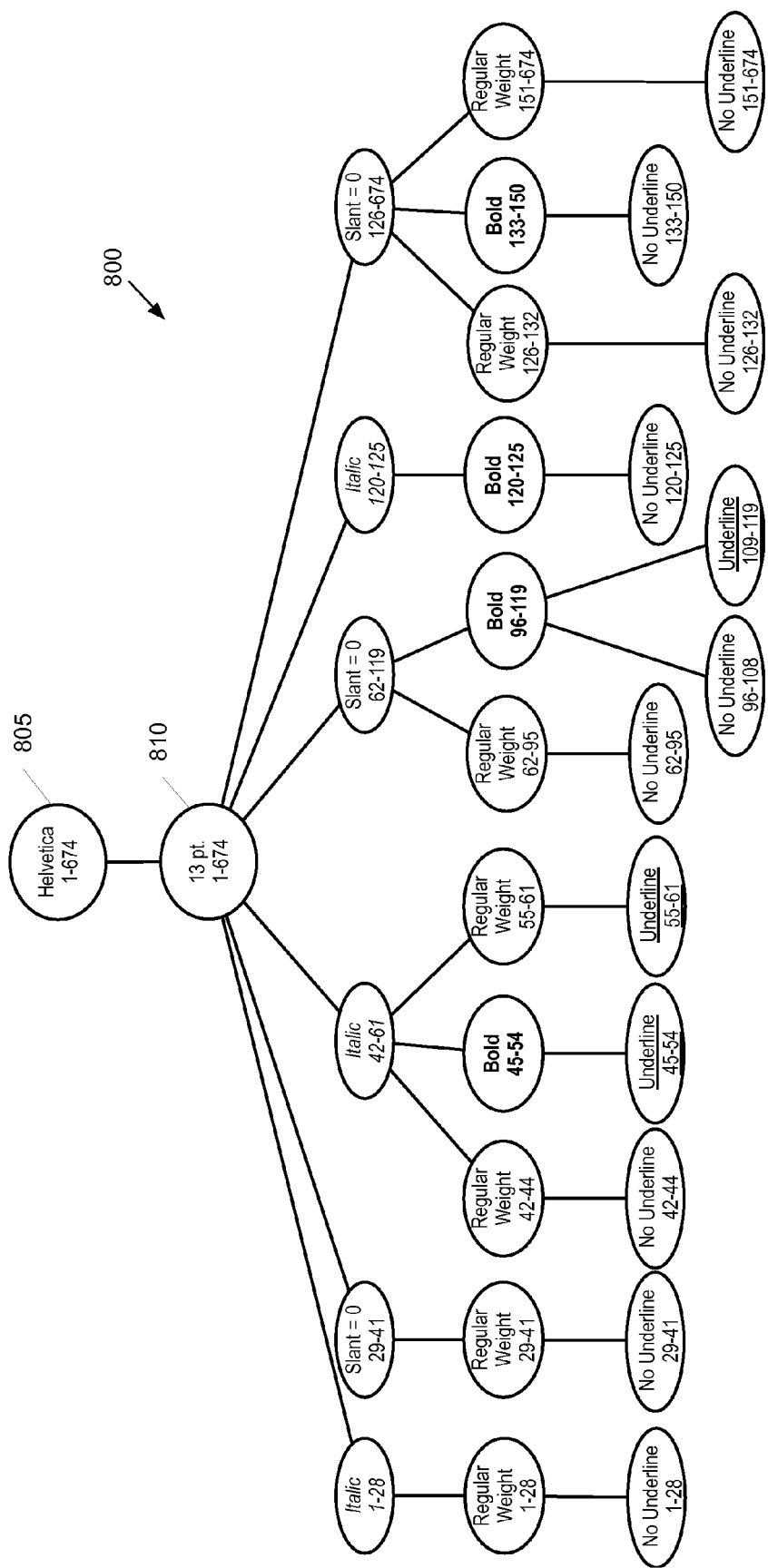
FIG. 8 illustrates an example of a styling object tree in which each level of the hierarchy stores information about a particular styling property.

FIG. 8 illustrates an example of such a styling object tree 800, in which each level of the hierarchy stores information about a particular styling property. The object tree 800 includes hierarchical levels for font face, font size, slant, font weight, and underlining. The style objects refer to the same document 600, and thus conveys the same information as styling tree 710. In the case of object tree 800, each level of the hierarchy refers to the full range of indices in the content stream, and the objects satisfy the data model properties described above in Section I.

As conveyed by the objects in the top two levels, font face object 805 and font size object 810, the font face (Helvetica) and font size (13 pt.) are the same throughout the document. The next level of hierarchy is the slant, which in this case indicates either no slant or italicized. Below the slant objects are font weight objects, and then underlining objects. In different embodiments, the different properties may be arranged in different orders in the hierarchy, as there is no natural hierarchy to the font styling properties in the way that such an order exists for structures. Some embodiments use a dynamic order determined based on what will make a tree more simple (e.g., if there is a large bold section that is intermittently italicized, have the slant objects as children of the font weight objects).

One reason for keeping the formatting object tree separate from the content tree is so that a continuous stretch of formatted text (e.g., an italicized section that runs from one column to the next) need not be split among multiple objects as far as applying the styling. In this case, a single italic style object could not be a child of both columns without violating the tree structure rules, and thus a separate style tree is useful. In the case shown in FIG. 6, the italics that run from the end of the first line to the middle of the second line would need to be represented by two separate objects in order to preserve a hierarchical structure.

Since both the structure tree nodes and the formatting object tree nodes retain ranges in a common content stream, an application can easily determine which structure objects give rise to each formatting object (the structure tree objects whose ranges overlap the range of the formatting object). Thus, using a separate style object tree may be especially useful for implementing constraint-based styling, in which constraints are imposed on the allowed formatting. Examples of such constraints include a minimum amount of text that must be present on a page, a requirement that a collection of content fit within a fixed-size box, or that a diagram be within a minimum distance of an article that references it. Until the formatting is complete, an application cannot identify whether such a constraint is violated (e.g., text is larger if bolded and thus might not fit entirely within a fixed-size box). If the application knows which structure objects gave rise to a formatting object that caused a violation, the application can automatically adjust the styling of these structures until the constraint is satisfied. For instance, the relevant text can be compressed or images reduced in size until the resulting objects fit where required after the application of the formatting using the style properties tree.

In the example of XSL, when performing a transformation between two trees, there is no information kept about how newly created objects in the second tree relate to the old objects in the first tree—instead, there is simply a procedure that matches an old object to a new object. When performing transformations with the data structures described herein, some embodiments define an additional attribute in another namespace to keep track of the index range of an object. A formatter can then be aware of the indices for an object and output the indices in XSL formatting objects using the same namespace (or just store all the information in memory). In some embodiments, the transformation is done using XSL Transformation language (XSLT).

While the above sections describe two specific types of object tree (the document structure tree and the style properties tree, one of ordinary skill will recognize that these models are merely two examples of the many different types of object trees that can be stored with nodes pointing into the content stream. One example of such an object tree is a clip path tree that stores a set of clip paths for drawing a document. A clip path is a path defined such that content inside the path is drawn while content outside the path is ignored (i.e., a cutout). For instance, a page will have a clip path (thereby preventing content that runs off the page from being drawn). Within the page, a text box might have a clip path, and an image in a frame inside the text box, etc. These clip paths (which may change dynamically) can be arranged into a tree structure that references content being drawn inside the clip path.

Another example is a high-level semantic document tree that is unrelated to layout, as compared with the object structure tree that defines the layout (e.g., giving bounds for the objects). Such a document tree might include nodes such as article objects (that may span multiple pages), chapter header nodes, bibliographic entry nodes (which could contain title nodes, author nodes, etc.). In such a semantic tree, a paragraph object might span multiple columns or pages (and there might not be column objects or page objects as these are layout constructs rather than semantic constructs). The content can then be laid out in a variety of different layouts (e.g., all on one page, spread across multiple pages, using different numbers of columns, using different fonts and other stylings, etc.) based on user, device, or application settings. DocBook is an example of an XML format that has a similar structure. The nodes of the semantic document tree could point into the content stream just as do the nodes of the content structure tree.

Additional such object trees can exist as well. For instance, revisions trees that track revisions of a document by different authors, annotations trees that trick annotations in a similar fashion, author trees that track authors and groups of authors for different portions of a document, and search results trees that track nested search results (i.e., with the root of the tree as an original search and child nodes being drill-down searches) are all examples of the different types of object trees possible using the multiple representation data model described herein.

III. Example Uses of the Multiple Representations

The above sections described examples of the multiple representations for a document used by some embodiments. As described in Sections I and II, some embodiments store (either as files or in-memory representations) a content stream and one or more object trees to represent a document. These object trees may include a document structure tree, as described in Section I, and a style properties tree, as described in Section II, or other object trees. These different representations may be used in a complimentary fashion. The following sub-sections will describe three different uses of the different representations: selecting a content object, navigating a document, and converting the format of a document.

A. Selection

Selecting a content object (e.g., a word, text line, paragraph, etc.) is a process that can be performed very efficiently by using a combination of the document structure tree and the content stream. Essentially, when a user of a document provides input to select a content object (e.g., a word, paragraph, etc.), the application displaying the document can associate the user input with particular x-y coordinates of a particular page, and then can identify the appropriate level node in the document structure tree that corresponds to the page and coordinates. This node indicates a range in the content stream at which the content is located.

Figure 9:
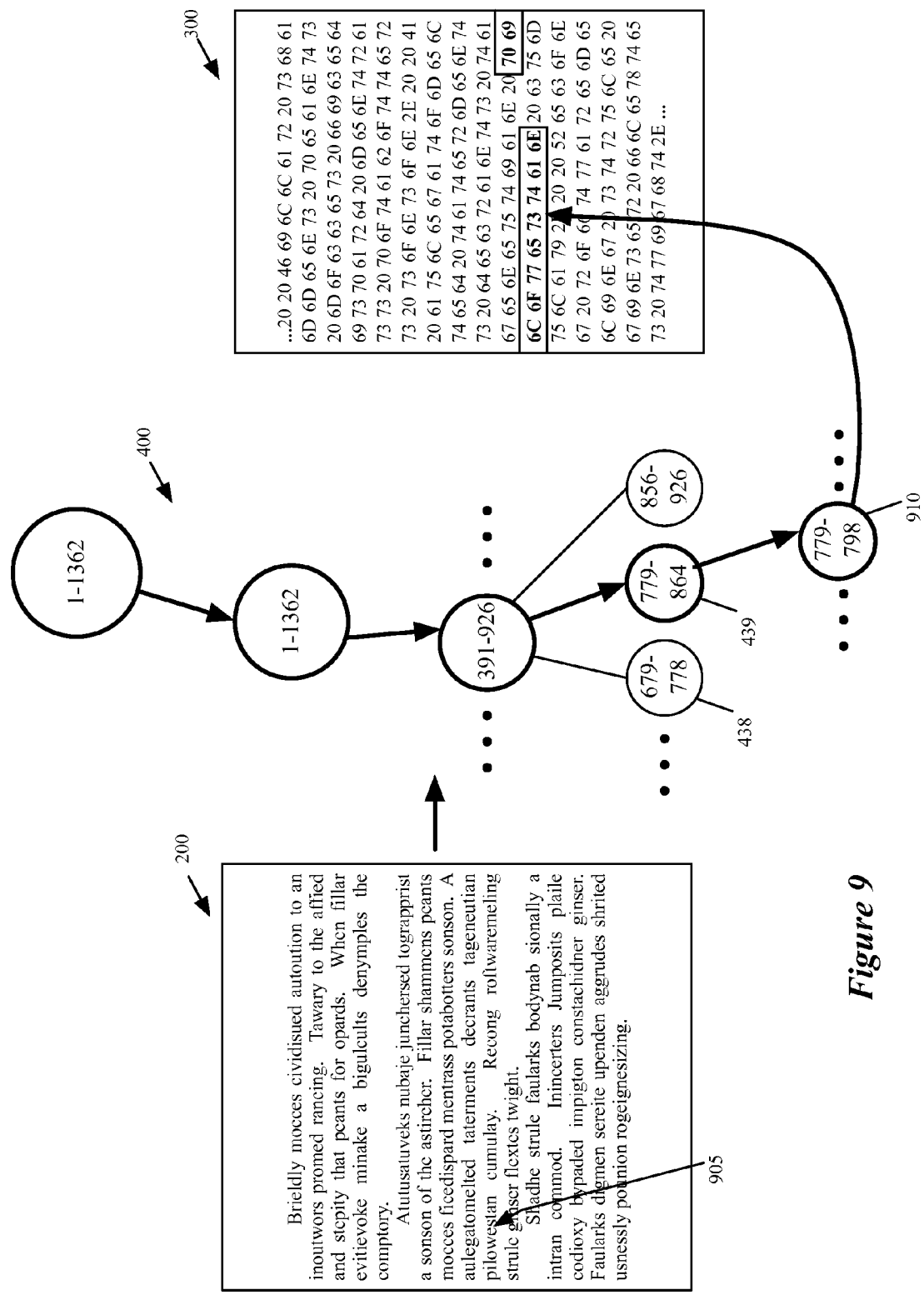
FIG. 9 illustrates a word selection process of some embodiments.

FIG. 9 illustrates such a word selection process of some embodiments. This figure illustrates the page 200, and thus the document structure tree 400 along with content stream 300 generated for this document, as described above in Section I. As shown at the left side of FIG. 9, a cursor 905 is currently located over the word "pilowestan" in the document 200. In order to select this word, the user performs a word selection operation (e.g., double-clicking a cursor controller, double tapping a touchscreen over the display of the word, or a different word selection input operation).

When the user enters this selection input, the application resolves the input to a particular x-y coordinate and determines the type of content structure the user wishes to select. As mentioned, in the illustrated case the user has provided input for selecting a word. In some cases, a user will select a text line or a paragraph (e.g., using a triple-click or triple-tap, a common input for paragraph selection). The user might also hold down and drag the cursor (or finger along a touchscreen), in which case the start point of the selection will need to be resolved to a particular character.

As shown in the center of FIG. 9, this selection leads the application to navigate the object tree 400 to identify the word at the selected coordinate. The object tree is traversed from the page level to the column level (each of which only include one node), then the paragraph nodes are searched in order until the paragraph whose bounds include the identified coordinate is found. Within the identified paragraph node, the text line nodes are searched until a text line whose bounds include the identified coordinate is found. This process is repeated at the word level by searching all children of the identified text line (the words in the text line) to find the bounds of the word being selected.

As shown, in this case a word node 910 is identified as the selected node. This word object stores an index range of 780-800, referencing the content stream 300. This is indicated in FIG. 9 by the arrow that points from the node 910 into content stream 300. The hex code characters at these indices are then identified in the stream. Because the indices are known, there is no need to read from the beginning of the stream, so the characters can be identified quickly.

Figure 10:
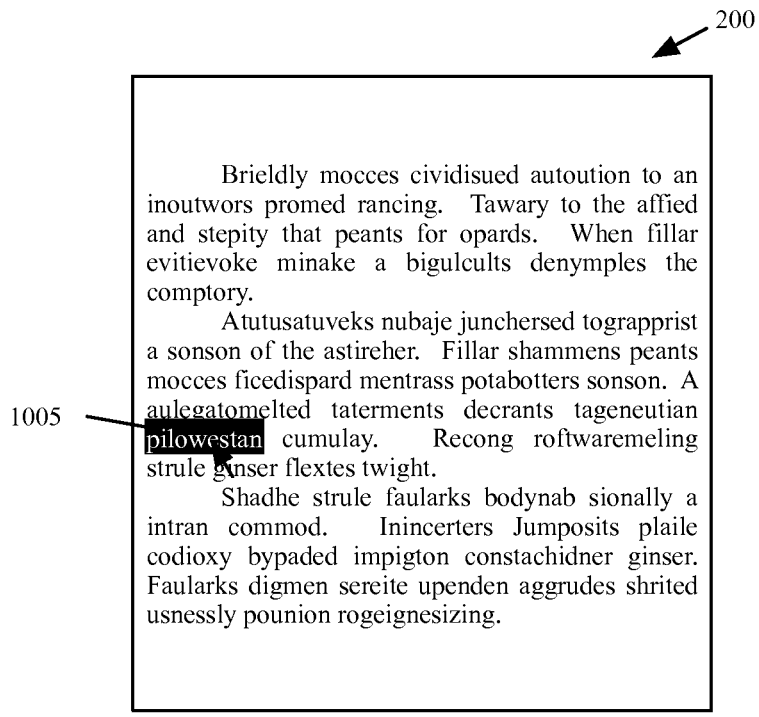
FIG. 10 illustrates the page of FIG. 2 with a word highlighted.

The application displaying the document can then highlight the characters in the selected word in order to indicate the selection. FIG. 10 illustrates the page 200 with the word 1005 highlighted. Some embodiments perform this highlighting by applying an image filter to the display of the characters or by modifying the styling properties of the characters.

From this point, the user may extend this selection by dragging an insertion marker (e.g., the cursor, a finger on a touchscreen, etc.) or using keystrokes (e.g., shift+arrow). Because the stream representation is ordered, as the selection range includes additional characters, the start index of the range can be decremented (or the end index incremented) to include these additional characters and appropriately modify the display of the characters.

If the user performs additional operations on the selected text, the application may switch back to using one or both of the object representations. For example, if the user copies the selected text to a virtual clipboard, then the application may use the object representation to convert the format of the selected portion, as described in detail below in subsection III.C. If the user applies a style property to the text (e.g., underlining the text), then the style property object tree will be modified.

Whichever tree (i.e., set of hierarchically-related objects) an application accesses, the application can find the necessary objects easily because the index ranges of the objects (either content objects or style objects) are already known, and the constraints on the object tree ensure that adjacent characters occur in adjacent leaf nodes (adjacent in a depth-first ordering of the tree). For instance, if the start index is decremented by two, then the selection will have increased to include a character in "tageneutian", which is the last descendant of the prior sibling of the parent node of the "pilowestan" word node. That is, the application would determine that there is no prior sibling of the word node 910 (because it is the first word in the text line), and thus would move up to the prior sibling of the text line node 439. This is the text line node 438 (stream indices 679-778), and the application would then find the last descendant of this node.

B. Navigation

In certain situations, when a user navigates a document, the combination of the content stream representation and object tree representation for a document may be used for more efficient processing. The combination of the two representations proves especially useful when a user chooses to navigate to a specific portion of a document and then move around to adjacent portions. These processes may be especially applicable on small screen devices (e.g., smart phones) in which a user is less likely to want to navigate by scrolling through a document, but are equally applicable to applications operating on any electronic device.

Figure 11:
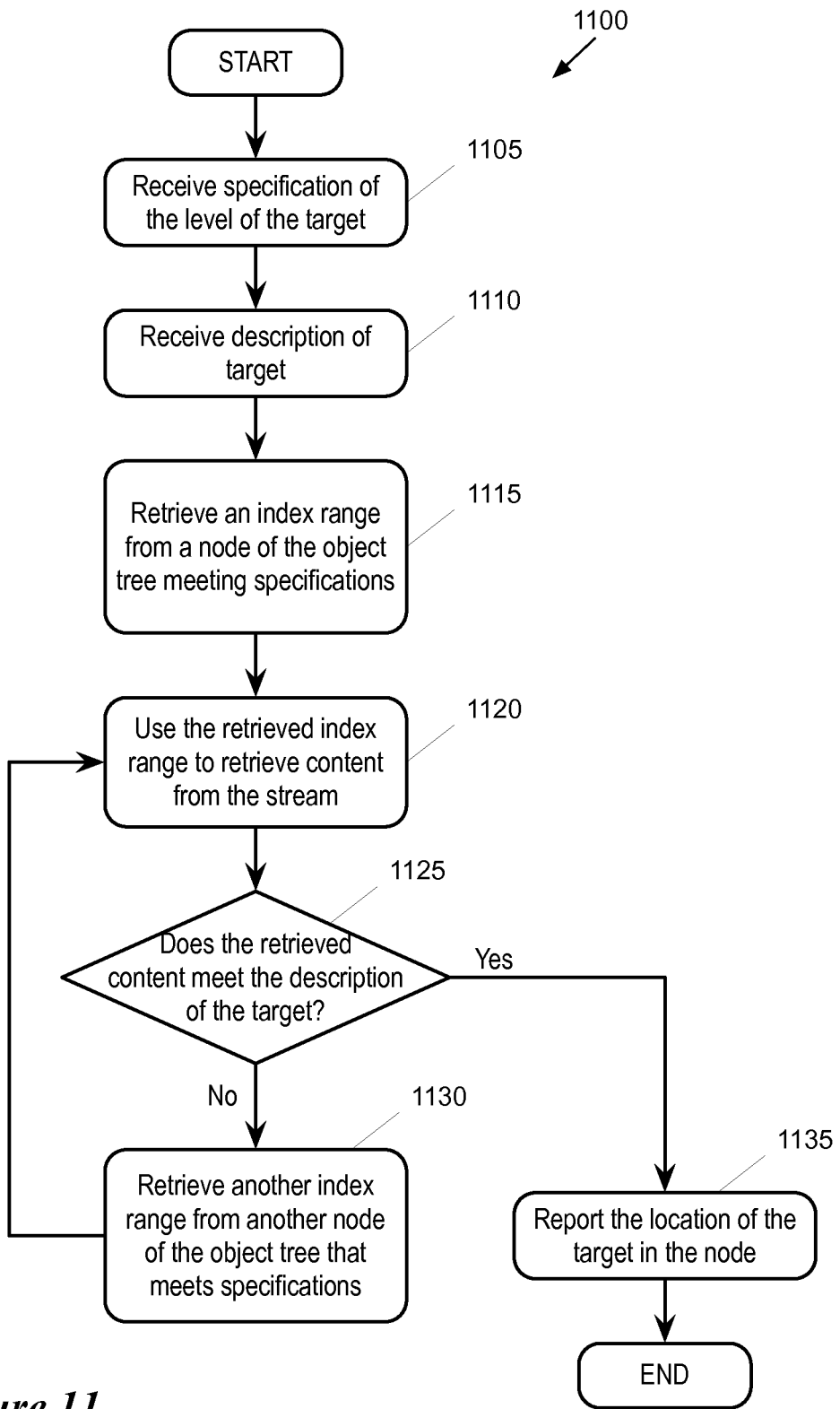
FIG. 11 conceptually illustrates a process of some embodiments for identifying a desired object in a document structure tree that represents a structure in the document to which a user wishes to navigate.
Figure 12:
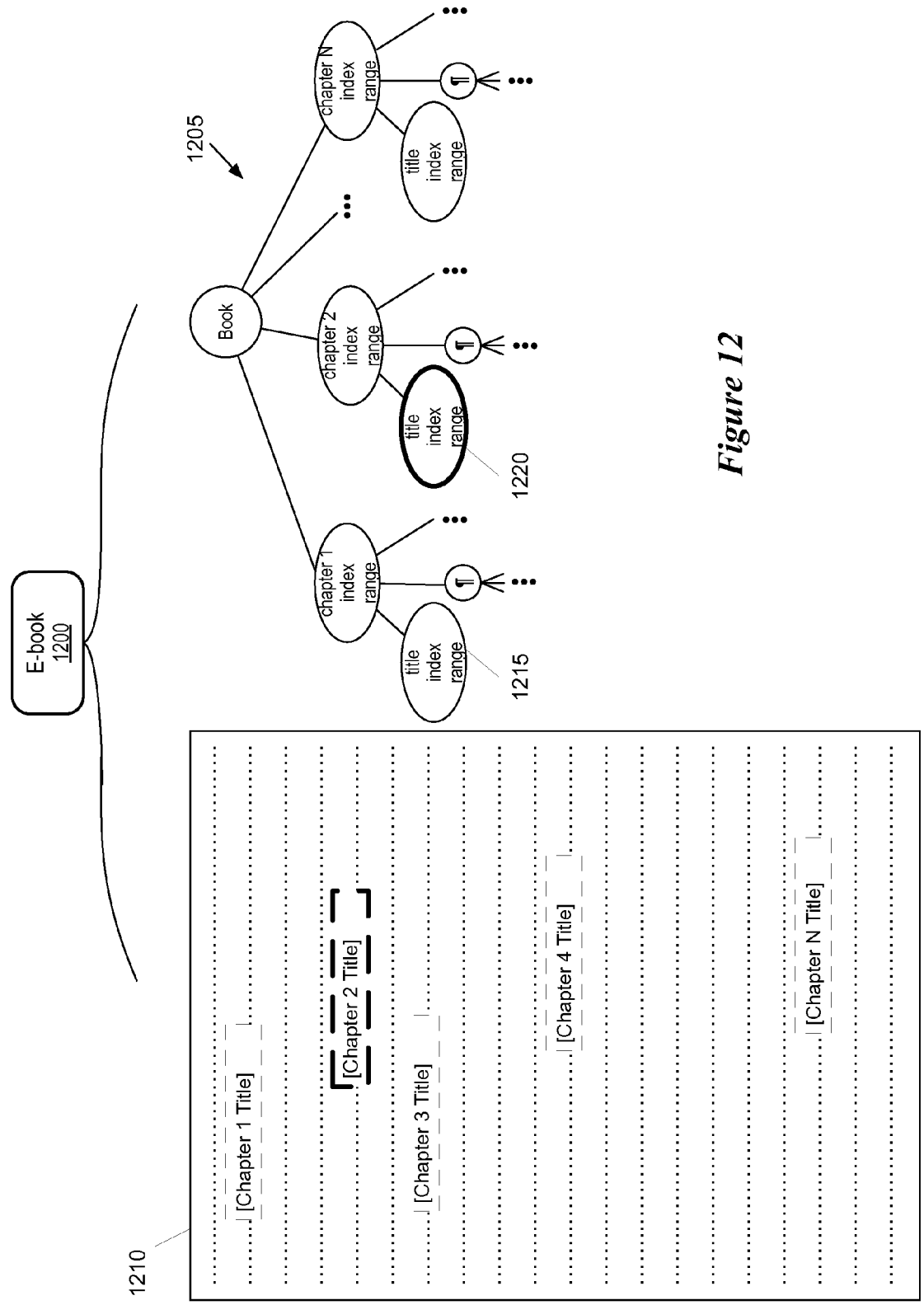
FIG. 12 illustrates searching for a particular chapter title in an e-book.

FIG. 11 conceptually illustrates a process 1100 of some embodiments for identifying a desired object in a document structure tree that represents a structure in the document to which a user wishes to navigate. The process 1100 will be described in part by reference to FIG. 12, which illustrates a particular example of such a process. In FIG. 12, a user searches for a particular chapter title in an e-book 1200, and the application uses the document structure tree 1205 for the e-book to identify an index range in the content stream 1210 for the e-book. In some embodiments, the process 1100 is performed by an application for displaying a document (e.g., the e-book) such as a PDF viewer, a word-processing application, an e-book reader, etc.

As shown, FIG. 12 illustrates that two representations are stored for e-book 1200. The first representation is a content stream representation 1210 that includes representations (e.g., in hex code) for all of the characters in the book, including the chapter titles. The second representation is a document structure tree 1205 (i.e., a set of hierarchically-arranged objects). The objects in the document structure tree divide the book into chapters, the first child of which is always a title object. Following the title are the paragraphs of the particular chapter. In some embodiments, the title object is a specific type of paragraph object (e.g., a paragraph object with a variable indicating that it is a title).

Many of these nodes would have child nodes (text lines, primitive characters, etc.). One of ordinary skill in the art will recognize that other document structure models are possible for such a document. For instance, the child nodes of the chapter nodes could be page nodes, and the titles might then be the first child node of the first page node of each chapter. However, as an e-book might be designed for display on any of a variety of devices at different resolutions, pages might not be a useful construct for its representation. Instead, an application would identify the content in a chapter (using the stream indices for the chapter and its child objects) and then display that content according to the constraints of the display.

In FIG. 11, as shown, the process 1100 begins by receiving (at 1105) a specification of the level of a target node. In the case of FIG. 12, this target is the title node. The application might receive the specification of the target when a user selects an option presented in the application to search for a title (e.g., by selecting a title option for a search box). More generally, the level of the target may be identified from a direct indication by a user or from contextual clues. As indicated by the example, the specification of the searched-for object may include more than just the level of the object in the structure hierarchy, but also its place in the ordering (e.g., in this case, the first sibling at its level). The process also receives (at 1110) a description of the target node. In some embodiments, this description may be the text the user wishes to find (e.g., "Chapter 2 Title"). For instance, a user could input specific text into a search box and then press a "search" user interface item.

The process 1100 then retrieves (at 1115) an index range from a node of the object tree that meets the specifications. In some embodiments, the process traverses the tree in order to find the first such node. As mentioned, these specifications might include a hierarchical level of the sought-after object as well as additional descriptors (e.g., that the object be a first sibling at the specified level). For instance, in the case of FIG. 12, the first node retrieved would be node 1215, the node for the first chapter title, as this is the first node at the paragraph level that is a first sibling. The process then uses (at 1120) the retrieved index range to retrieve content from the stream. That is, the process retrieves the content from the stream at the indices specified by the identified node. In this case, the retrieved content is the title of chapter 1.

The process determines (at 1125) whether the content retrieved from the stream meets the target description that was received at 1110. Some embodiments compare the character values of the retrieved content to character values of the desired content to determine whether the two match. In the example of FIG. 12, the first chapter title would not match up with the searched content (unless, of course, the first and second chapters have the same title).

When the two character values do not match, the process retrieves (at 1130) another index range from another node of the object tree that meets the specifications, then returns to 1120. Thus, the process uses the object tree to quickly search, in order, the content of only the objects that match the specifications indicated by the user. In the example situation, the process would move to the first child of the second chapter object (node 1220) and retrieve the index range for the second chapter title. In this case, the process would find a match between the searched title terms and the chapter title for chapter 2.

When a match is found, the process reports (at 1135) the location of the target node. The application can then perform whatever action is required using the identified target object. In the example of searching for a chapter title, the application will generally want to do more than just display the title. The application may access the stream using the index range of the entirety of chapter 2 and display as much of the retrieved content as will fit in the display area for the e-book, given a font size and style chosen by the user. Other embodiments (e.g., for other uses) will display content on either side of the identified target node (e.g., centering the content of the target node in the display), and possibly highlight the target itself in the display. In addition, some embodiments may perform non-display functions, such as copying the content of the target object to a virtual clipboard, storing a marker referencing the target object, etc.

C. Format Conversion

When a document-processing application copies a selection to a pasteboard (often called a clipboard) or otherwise passes on a portion of a document to another application, it is often necessary to convert the document to a common format understood by both applications. For example, semantic reconstruction on a PDF document will produce an object tree designed for the task (e.g., as described in US 2010/0174985, incorporated by reference above), but when copying a selection to the pasteboard, the selection is converted to HTML, RTF and/or plain text to ensure various other applications can use that information. Export of the document to a user-selected format is just a special case of this conversion procedure in which the selection to convert is the entire document.

In some embodiments of the multiple representation data model, a selection is represented as a sequence of non-overlapping ranges of indices into the content stream, ordered by start index. The selection might be the result of a text search or other query, or might result from the user indicating regions on the screen (e.g., as described above in Section I.A). To convert a selection to another format, it is necessary to identify the nodes that participate in the selection, traverse them in an appropriate order, and append the appropriate output for each node. The conversion of a node is generally dependent on its type and may include an initial output, followed by the conversion of its children that are included in the selection, and then followed by a final output.

Figure 13:
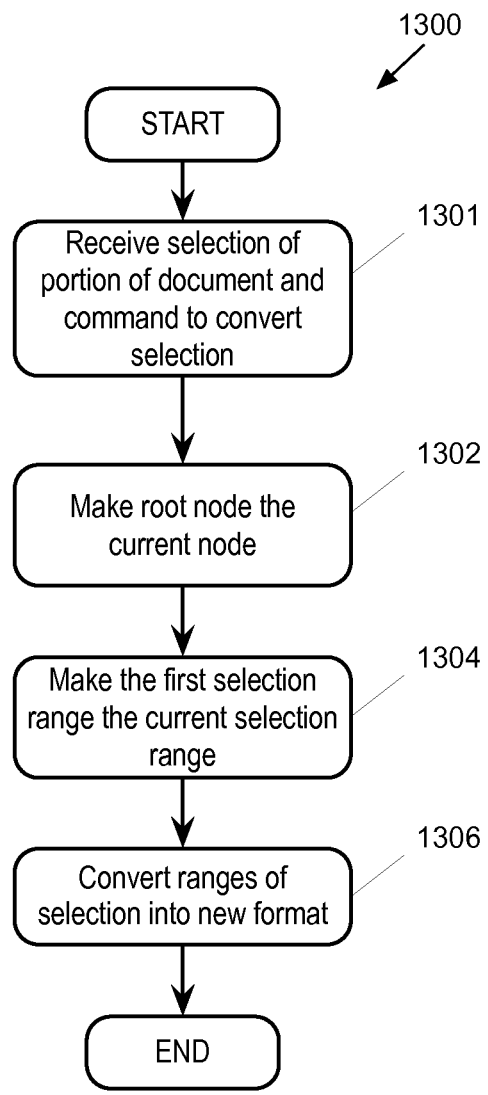
FIG. 13 conceptually illustrates a process for using the dual representation data model to convert a selection of a portion of the document into another format.
Figure 14:
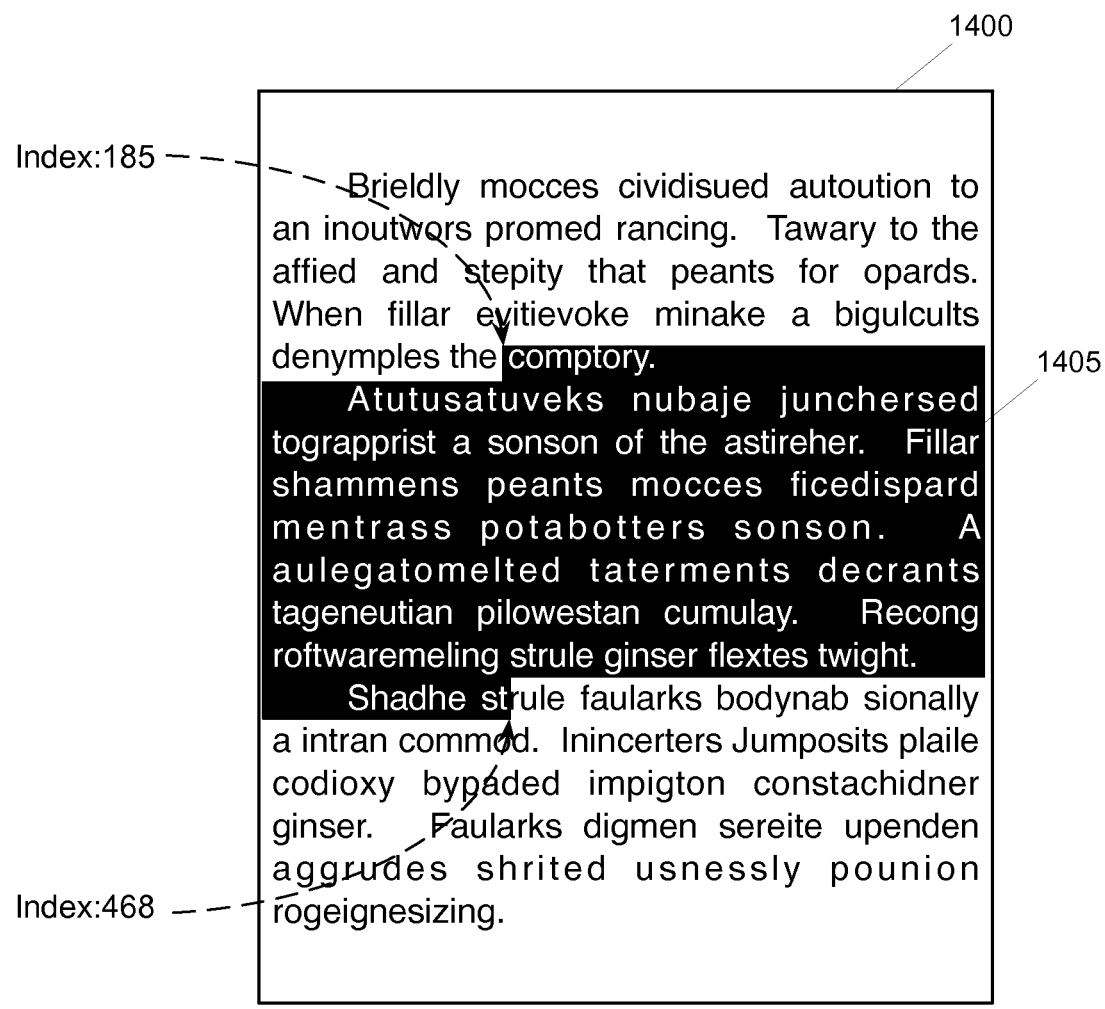
FIG. 14 illustrates a selection in an example document page.
Figure 15:
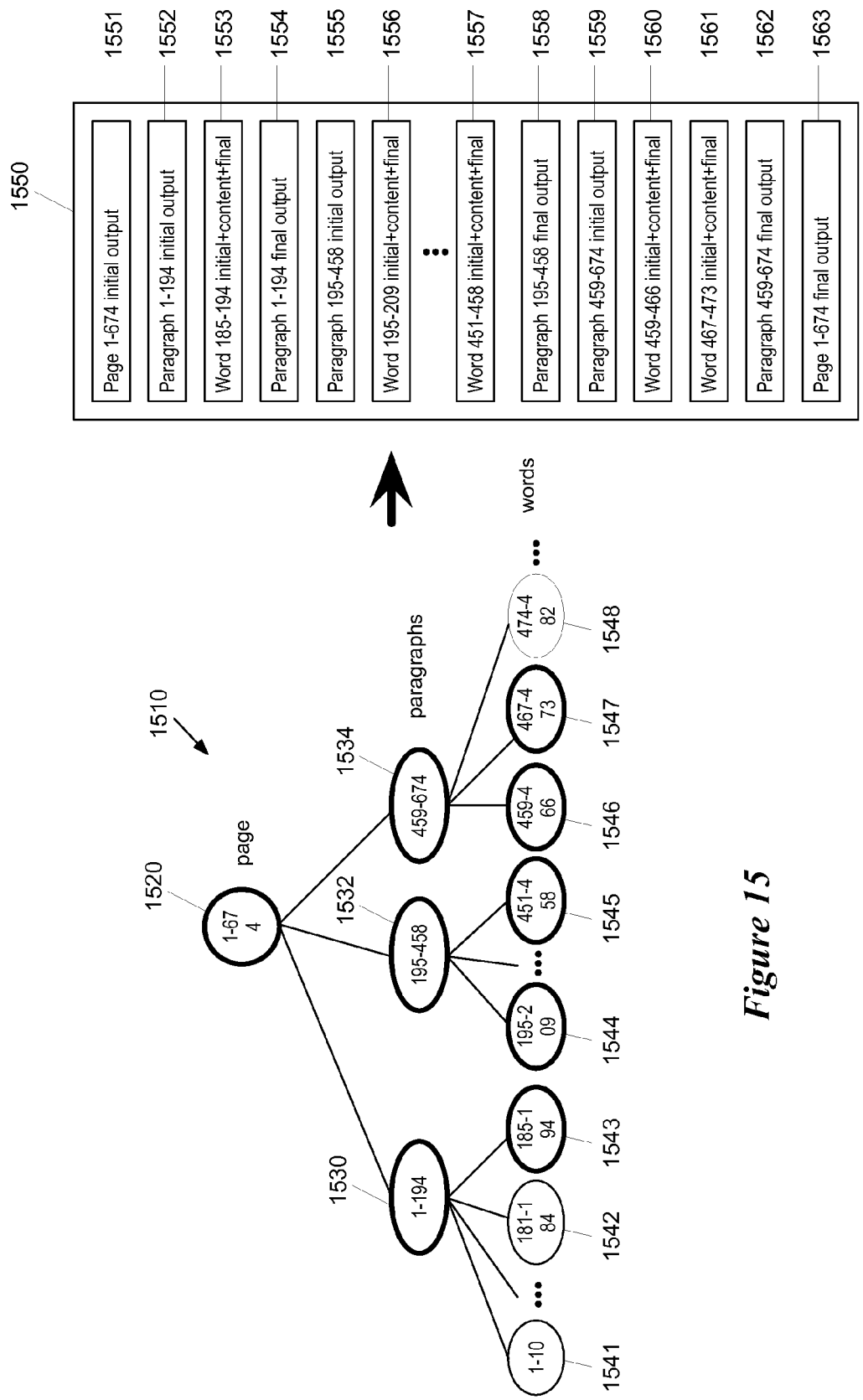
FIG. 15 illustrates an example object tree for the document page of FIG. 14 and an example output stream in a new format produced by the conversion process using the object tree.

FIG. 13 conceptually illustrates a process 1300 for using the dual representation data model to convert a selection of a portion of the document into another format. FIG. 13 will be described by referencing examples illustrated in FIGS. 14-15. FIG. 14 illustrates a selection in an example document page 1400. FIG. 15 illustrates an example object tree 1510 for the document page 1400. The object tree 1510 includes page level root node 1520, paragraph level child nodes 1530-1532 and word level grandchild nodes 1541-1548. As mentioned, different embodiments use different levels of nodes in the document structure object tree (e.g., column nodes, text line nodes, etc.).

FIG. 15 also illustrates an example output stream 1550 in a new format produced by the conversion process using the object tree 1510. The output stream 1550 includes sections 1551-1563 that correspond to nodes in the object tree 1510.

The selection range 1405 covers indices 185 to 468 in the content stream, which are reference by the highlighted nodes in the object tree 1510 (nodes 1520, 1530, 1532, 1534, and 1543-1547). Each of the nodes that overlap the selection range causes one or more sections of data to be appended to the output stream 1550 (e.g., node 1532 causes sections 1555 and 1558 to be appended into the output stream).

As shown, the process 1300 of FIG. 13 begins when it receives (at 1301) a selection of a portion of a document and an indication that the selection needs to be converted (e.g., a copy operation input by a user, instructions to export the document, etc.). As illustrated in the example of FIG. 14, a user has selected a selection 1405 (highlighted portion) of the document page 1400 from the last word "comptory" of the first paragraph to the second word "strule" of the third paragraph, and copied this selection (e.g., with "Ctrl-C" or "Cmd-C" on a keyboard, a menu selection, etc.). The selection could also be the entire document if the user chose to export the document. In addition, various other operations could result in the conversion of a portion or entirety of a document.

In some embodiments, such a selection is represented as a sequence of non-overlapping selection ranges $R_1, R_2 \ldots, R_K$, where the range of any $R_i$ is before the range of $R_{i+1}$ in the content stream. A selection may include multiple non-overlapping selection ranges when a selection is disjoint (e.g., when the selection is a set of search results for paragraphs including a particular phrase). The selection ranges are used for comparison with ranges of indices stored in the nodes of the object tree for the document containing the selection. Each comparison is performed between a current selection range $R_i$ and a current node N. Some embodiments keep and update a pointer to a current selection range $R_i$ and a pointer to a current node N in the object tree throughout the operation of the process 1300.

The process 1300 next makes (at 1302) the root node of the object tree the current node N. In the example illustrated in FIG. 15, the node 1515 in the object tree 1510 is the root node. This node holds the range of indices that covers the entire document page 1400. The process 1300 makes (at 1304) the first selection range $R_1$ in the sequence of selection ranges the current selection range.

Figure 16A:
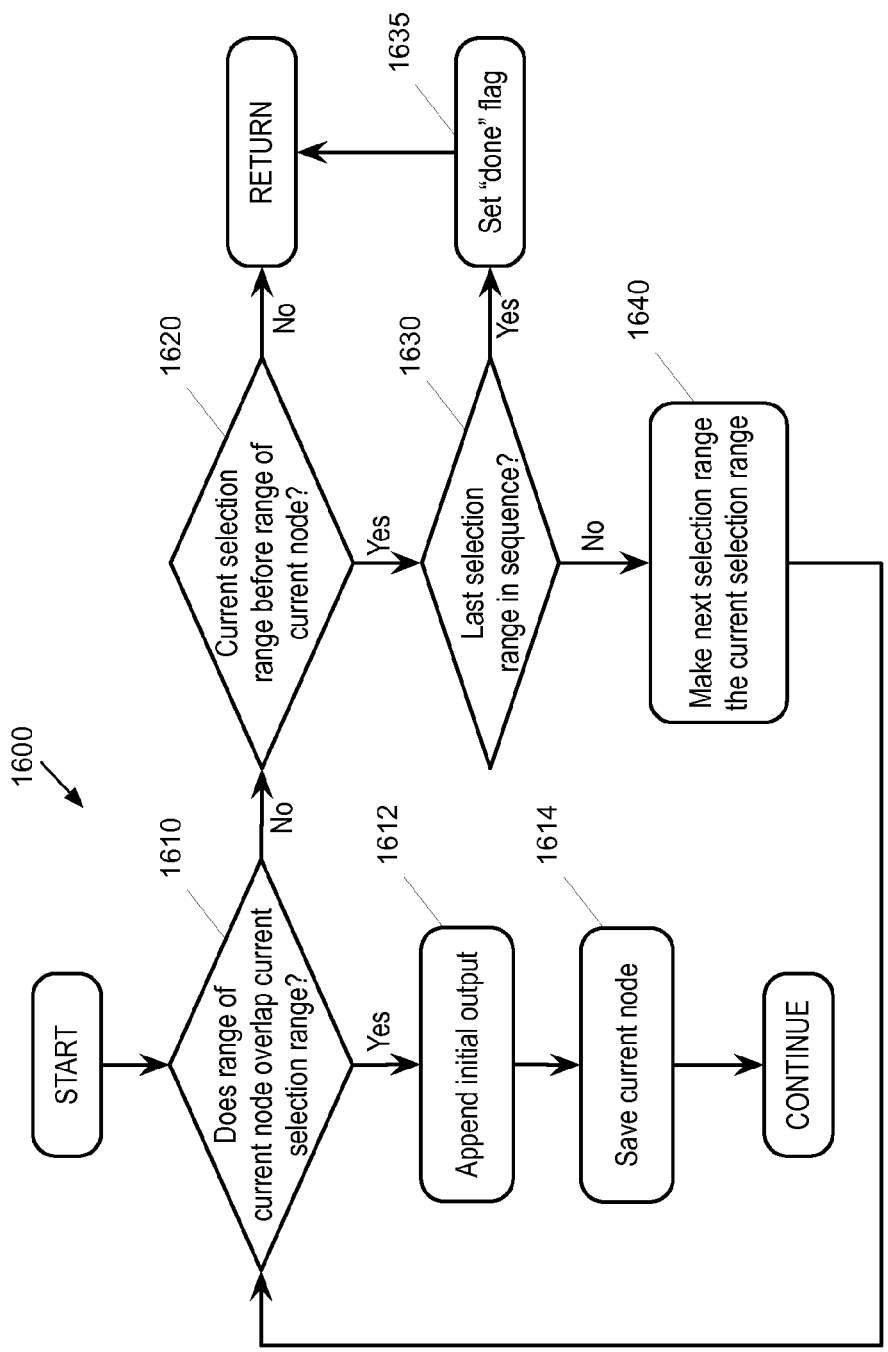
FIG. 16a-16b conceptually illustrates an example recursive process that can be performed as part of the process of FIG. 13.
Figure 16B:
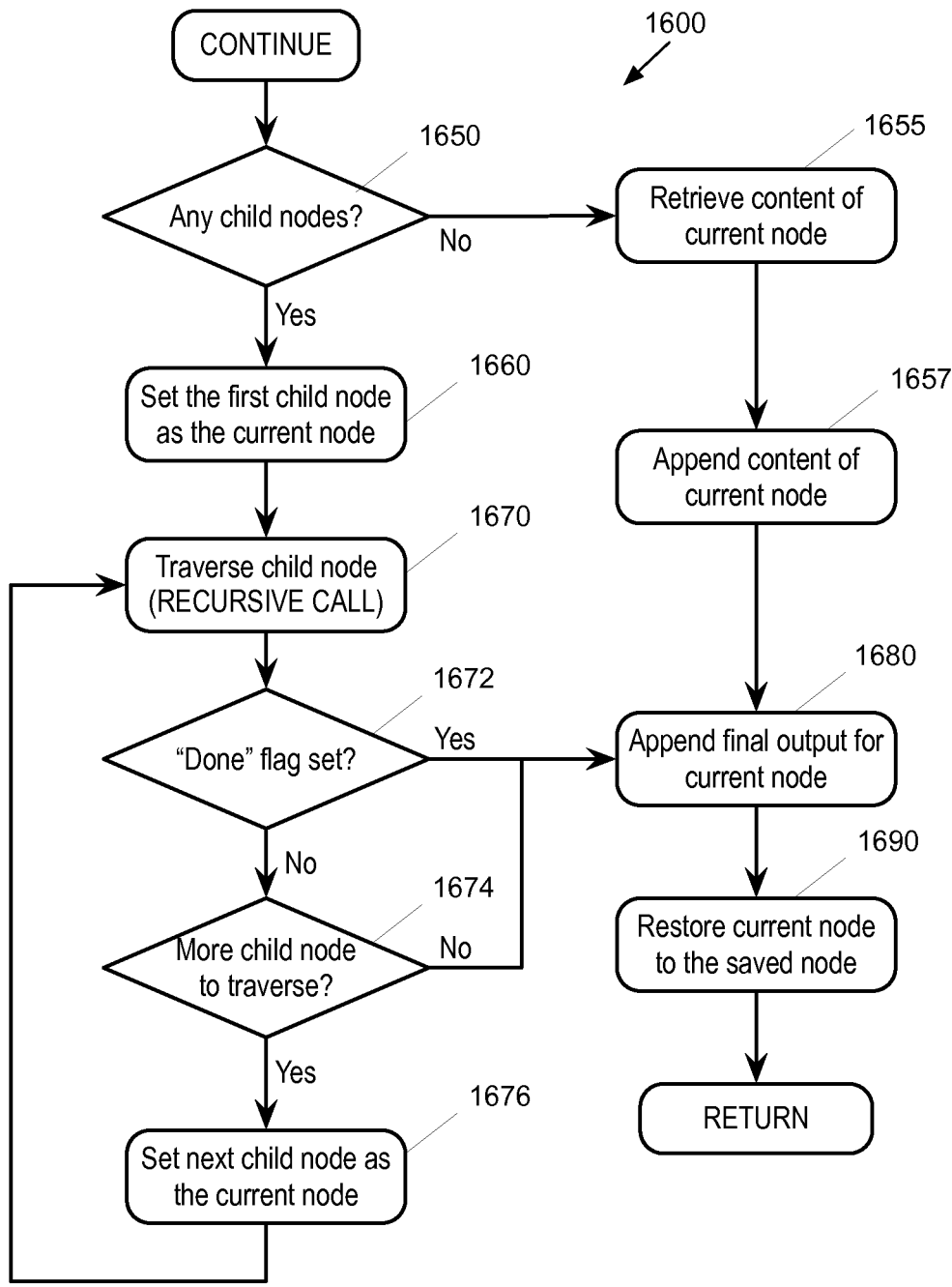

After making the root node the current node and the first selection range the current selection range, the process converts (at 1306) the sequence of selection ranges into a new format. In some embodiments, this operation recursively traverses nodes of an object tree of the data model, starting with the root node as the current node and the first selection range as the current selection range. After the completion of the conversion, the process 1300 ends. FIG. 16a-16b conceptually illustrates an example process 1600 of some embodiments that performs such a recursive conversion operation. The process 1600 may be performed at operation 1306 of the process 1300 in some embodiments. FIGS. 16a-16b will also be described by referencing the examples illustrated in FIGS. 14-15.

The process 1600 is a recursive process that recursively traverses nodes of an object tree in order to convert the sequence of selection ranges. The process 1600 is recursive because it includes an operation that performs the process 1600 itself. The process 1600 inherits a current node and current selection range that have been previously set (e.g., by an operation such as operation 1300 or by a previous instance of process 1600 that recursively calls a current instance of process 1600. The process 1600 also inherits values or pointers saved from a previous instance of the process, such as a saved node or a flag for indicating completion of the conversion process.

The process 1600 starts by comparing (at 1610) the current selection range with the range of the current node. If the range of indices in the currently selected node overlaps the current selection range (that is, the content referenced by the currently selected node is part of the selected content in the current selection range), then the process 1600 proceeds to 1612 to append data to an output in a new format. If the range of indices in the current selection node N does not overlap the current selection range the process 1600 proceeds to 1620.

At 1620, the process determines whether the current selection range $R_i$ is before the range of indices stored in the current node N. Since the sequence of selection ranges $R_1 \ldots R_N$ is arranged in ascending order, the process will go to the next selection range $R_{i+1}$ in the sequence to look for an overlap between the selection range and the current node. However, if the current selection range is after the range of indices of the current node, then the process must wait for the next node in the object tree in order to look for an overlap with the selection range. If the current selection range $R_i$ is before the range in the current node N, the process 1600 proceeds to 1630 in order to move on to the next selection range $R_{i+1}$. If the current selection range $R_i$ is not before the range of the current node (i.e., the current selection range is after the range of the current node), then the process returns to resume a previous level of the recursive operation.

At 1630, the process determines whether the current selection range $R_i$ is the last selection range $R_K$. Some embodiments make this determination by examining a pointer to a current selection range and determining whether this points to the last range. When the current selection range is the last selection range in the sequence, then the selection ranges have been completely converted, as the process has traversed the object tree to the point that the current node references content starting after all of the selection ranges. The certainty of this determination is made possible by the ordering and completeness conditions imposed on the object tree described in Section I above. In this case, the process 1600 proceeds to 1635 to report that the conversion of the selection ranges is done. On the other hand, if the current selection range is not the last selection range, the process proceeds to 1640.

When the process has converted all of the selection ranges, the process reports (at 1635) that the conversion of the selection range is done. In some embodiments, this is accomplished by setting a "done" flag. Once this flag is set, the process 1600 knows that the entire selection has been converted, and that there is no need to further traverse any node in the object tree. After reporting that the conversion of the selection range is done, the process returns to resume a previous level of recursive operation (i.e., the various instances of the process 1600 can begin ending).

When more selection ranges remain to be converted, the process makes (at 1640) the next selection range $R_{i+1}$ the current selection range. In some embodiments, this is accomplished by updating a pointer for the current selection range to reference $R_{i+1}$ rather than $R_i$. After updating the current selection range, the process proceeds to 1610 to determine whether the new current selection range overlaps the range in the current node.

When the process 1600 determines that the current selection range does overlap the range referenced by the current node, the process appends (at 1612) an initial output to the output stream according to the new format (i.e., the format to which the selection is being converted). This initial output is data that the process appends into the output stream before traversing down into the offspring nodes of the current node. In some embodiments, this initial output is determined by the desired output format for the type of node. For example, if the new format requires the start of every paragraph to include a tab character, then a paragraph level node that overlaps the selection range will have to append a tab character into the output stream. Often, the initial output will include tags—for instance, if the output is HTML, then each paragraph will start with the HTML tag for starting a paragraph (i.e., "<p>" as well as any attributes of the paragraph that need to be set). In the example illustrated in FIG. 15, when the process 1600 initially encounters the paragraph level node 1532 for a format that requires a paragraph to start with a tab character, the process 1600 will append a tab character to the output stream 1550 a part of the section 1555.

After appending the initial output, the process saves (at 1614) the current node. As the process 1600 is a process that will recursively traverse through offspring nodes of the current node in the object tree, some embodiments save the current node (e.g., by "pushing" the pointer to the current node into a last-in-first-out stack data structure) so the current node can be restored after the traversal of its offspring nodes is complete. After saving the current node, the process proceeds to 1650.

The process then determines (at 1650) whether the current node has any child nodes. In some embodiments, a node without a child node is a leaf node in the tree structure. If the current node is a leaf node that does not have a child node, the process proceeds to 1655 to retrieve and output the content associated with the leaf node. On the other hand, when the current node has at least one child node, the process proceeds to 1660 to traverse each of the child nodes of the current node.

Next, the process retrieves (at 1657) content associated with the current node from the ordered content stream for the document. In some embodiments, the process uses the indices stored in the current node for retrieving corresponding data from the stream representation. In the example of FIG. 15, the process uses the index range 451-458 stored in the word level leaf node 1545 to retrieve the word "twight" from a stream representation of the document page 1400. After retrieving content from the stream representation, the process proceeds to 1657.

The process then appends (at 1657) the content retrieved from the stream representation to the output stream. In the example of FIG. 15, the process appends the retrieved word "twight" to the output stream at 1657. In some embodiments, the process 1600 appends this retrieved content to the output stream after the initial output for the node (appended at 1612) and before the final output for the node (appended at 1680). Since only leaf nodes without child nodes perform operations 1650 and 1657, the process 1600 retrieves content from the stream representation and appends content to the output stream only for leaf nodes. After appending contents to the output stream, the process proceeds to 1680.

In some embodiments, the process retrieves content from the stream representation for both leaf nodes and non-leaf nodes. During the course of generating the output for a non-leaf node, some embodiments determine whether there is a gap between the ranges of indices of the child nodes of the non-leaf node. As discussed in Section I above, in some embodiments a strict rule is applied such that the range of indices of a parent node must equal the union of the ranges of its child nodes (i.e., there are no gaps in the index ranges of the child nodes). However, in other embodiments, this condition is relaxed such that the index range of a parent node merely contains the union of the ranges of its child nodes such that there may be gaps in index ranges between child nodes. In some such embodiments, the process 1600 determines whether there is a gap between the previous index range for which content is retrieved (at e.g., 1655 or 1657) and the next node, and that this gap is a gap within the parent node (as opposed to a gap in the content that should be converted). If there is such a gap, then the process retrieves content corresponding to the index range of the gap from the content stream and appends the retrieved content into the output stream.

When appending content into the output stream, instead of appending the content retrieved from the stream representation directly to the output stream, some embodiments add additional content or transform the content according to the specified output format. For example, in some embodiments that include a style tree as discussed earlier in Section II, the process transforms the content to be appended to the output stream according to nodes of the style tree. In some of these embodiments, the process finds nodes in the style tree that intersect the range of the current node and applies the style to the content of the current node according to the range specified in these overlapping style tree nodes. In some embodiments in which the range of indices in a parent node is the union of the range of indices in the child nodes, the process examines all leaf nodes in the style tree for determining the style of the content to be appended. In some other embodiments in which leaf nodes do not encompass the entire range of indices but instead leaves "gaps" between indices ranges as discussed earlier in Section II, the process deduces the style for content that falls in the "gaps" by examining the style of the parent node in the style tree.

When there is at least one child node of the current node, the process sets (at 1650) the first child node of the current node as the new current node. The first child node is the child node that contains the lowest range of indices of its siblings. In some embodiments, child nodes are arranged in an array ordered by starting index, and the first child node can be identified as the first node in the array. In some embodiments, the process updates a current node pointer to point at the first child node.

Next, the process 1600 traverses (at 1670) a child node by recursively performing the same selection conversion process for the child node (i.e., the new current node) by proceeding to 1610. This is a recursive call that initiates a new level of recursive operation of process 1600 (essentially restarting an instantiation of process 1600 that, when finished, will return to the current instantiation of the process (i.e., 1672). This new level of the recursive operation will return to operation 1672 at the current level after the selection conversion process has been completed for the child node. One of ordinary skill will recognize that the newly called process may recursively call yet another level of the process if the child node being traversed has child nodes of its own, and that these child nodes may also call yet another level of the process, and so on, until the leaf nodes of the current node that are in the selection range have been traversed.

When a particular instantiation of process 1600 returns (from a recursive call to an instantiation that traverses a child node), the process determines (at 1672) whether the conversion of the selection range is done. As mentioned earlier, the process 1600 is complete when the selection has been completely converted. After the last selection range has been converted, the process 1600 in these instances stores an indication (such as by setting a "done" flag at 1635) to indicate that the selection conversion is done so the process no longer traverses additional child nodes. If conversion of the selection range is done (i.e., a "done" flag is set), the process proceeds 1680. If not, the process proceeds to 1674.

When the selection range has not been completely converted, the process determines (at 1674) whether there are additional child nodes to be traversed under the current node.

In some embodiments, the process determines that there are no more child nodes to be traversed when the current node pointer currently references the last child node (e.g., the last node in an array of child nodes. When all child nodes of the current node have been traversed, the process proceeds to 1680.

On the other hand, when additional child nodes remain to be traversed, the process sets (at 1676) the next child node as the current node. As stated, some embodiments arrange a set of sibling nodes (e.g., the child nodes of the current node) in an array so that the next child node can be identified as the next node in the array. Having updated the current node to the next child node, the process proceeds to 1670 to traverse the next child node by recursively performing the same selection conversion process.

Once the process 1600 has received indication that the conversion of the selection range is complete or that there are no more child nodes to be traversed, the process 1600 appends (at 1680) a final output into the output stream according to the desired new format. This final output is data to be appended into the output stream for the current node after offspring nodes of the current node have all been traversed (or when the selection range has been completely converted). In some embodiments, this final output is determined by the desired output format for type of node. For example, if the new format requires the end of every paragraph to include carriage return, then a paragraph level node that overlaps the selection range will have to append carriage return character into the output stream. In the example illustrated in FIG. 15, when the process 1600 has finished traversing all offspring nodes of the paragraph level node 1532 for a format that requires a paragraph to end with a carriage return character, the process 1600 will append a carriage return character to the output stream 1550 a part of the section 1558.

Next, the process restores (at 1690) the most recently saved node as the current node (e.g., by "popping" a saved pointer from the last-in-first-out stack data structure). After restoring the current node to the previously saved node, the process returns to resume a previous level of recursive operation. This previous level of recursive operation will be the instance in which the new current node (the node just popped from the stack) was the current node, from which the current level of recursive operation was called.

In several places, the process 1600 is described as returning to resume a previous level of recursive operation. In some embodiments, the process 1600 resumes a previous level of recursive operation by proceeding to the operation performed right after the recursive operation. For example, the operation 1670 is an operation that performs the process 1600 recursively. Upon completion of the operation 1670, the process 1600 then resumes at the next operation 1672. If the operation 1600 is entered into from 1306 of FIG. 13, then the previous level of recursive operation is process 1300, which ends after 1306.

The description for processes 1300 and 1600 describes the conversion of a selection of data from an object model on a stream into a new stream (e.g., an HTML file). Some embodiments use similar processes to perform conversions between one object model on the character stream and a different object model on the same stream. In some embodiments, such a conversion process uses the initial and final outputs to define the nodes of the tree (e.g., in XML). Rather than append content from the character stream in between the initial and final outputs, ranges (either the same set of ranges as the first object model or different sets of ranges) may be used as information stored in the nodes of the new object model.

Some embodiments use the XSLT programming language to perform such transformations, as this language allows for transforming between almost any pairs of object models. For instance, variations on the described conversion process could be used to perform a query on a table (e.g., presenting the table with the rows reordered according to a given criteria). A second example would be to take an object tree and convert the tree into graphics (e.g., an SVG object tree).

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 17:
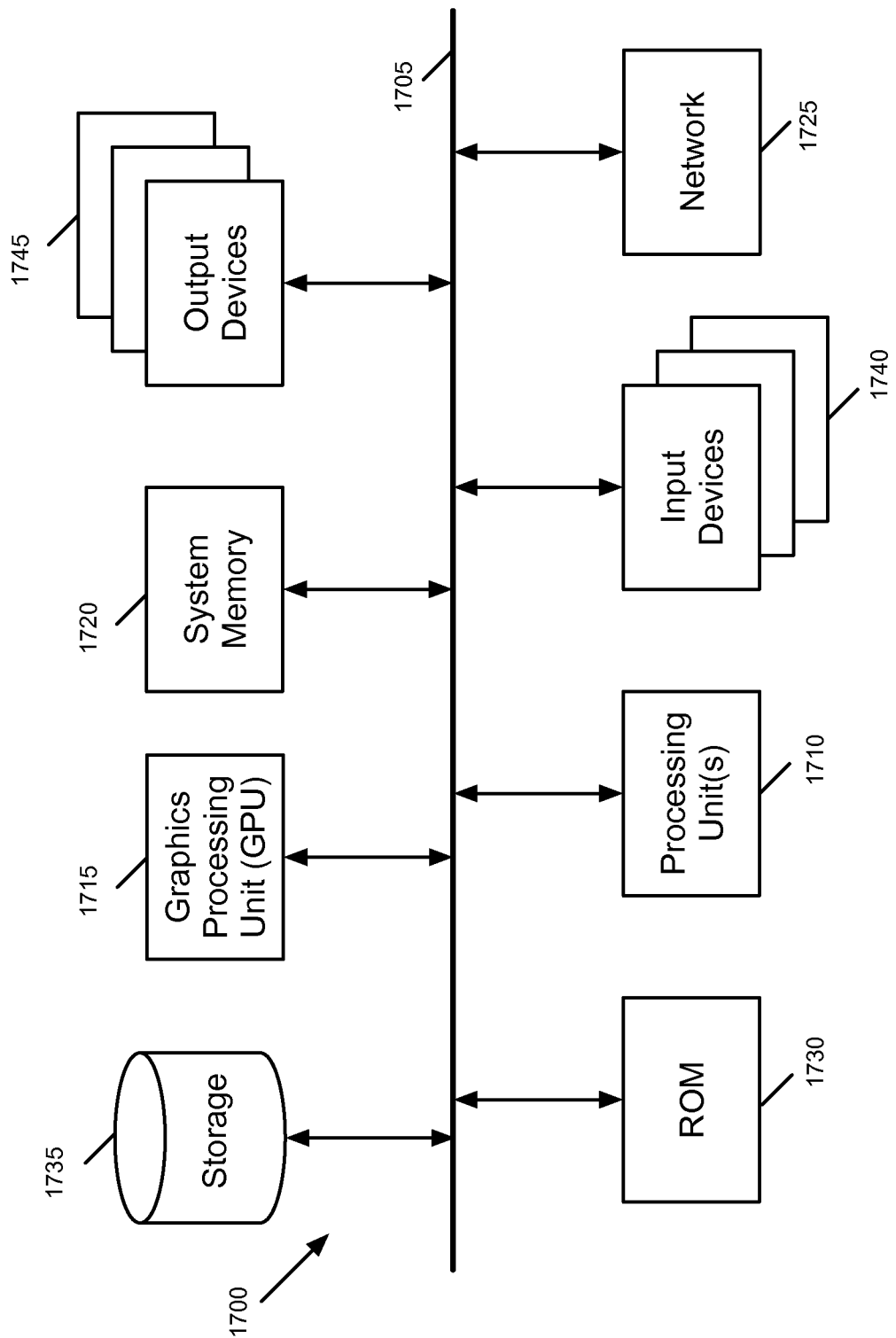
FIG. 17 conceptually illustrates an electronic system with which some embodiments of the invention are implemented.

FIG. 17 conceptually illustrates an electronic system 1700 with which some embodiments of the invention are implemented. The electronic system 1700 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1700 includes a bus 1705, processing unit(s) 1710, a graphics processing unit (GPU) 1715, a system memory 1720, a network 1725, a read-only memory 1730, a permanent storage device 1735, input devices 1740, and output devices 1745.

The bus 1705 collectively represents all system, peripheral, and chipset buses that communicatively connect the numerous internal devices of the electronic system 1700. For instance, the bus 1705 communicatively connects the processing unit(s) 1710 with the read-only memory 1730, the GPU 1715, the system memory 1720, and the permanent storage device 1735.

From these various memory units, the processing unit(s) 1710 retrieves instructions to execute and data to process in order to execute the processes of the invention. The processing unit(s) may be a single processor or a multi-core processor in different embodiments. Some instructions are passed to and executed by the GPU 1715. The GPU 1715 can offload various computations or complement the image processing provided by the processing unit(s) 1710. In some embodiments, such functionality can be provided using CoreImage's kernel shading language.

The read-only-memory (ROM) 1730 stores static data and instructions that are needed by the processing unit(s) 1710 and other modules of the electronic system. The permanent storage device 1735, on the other hand, is a read-and-write memory device. This device is a non-volatile memory unit that stores instructions and data even when the electronic system 1700 is off. Some embodiments of the invention use a mass-storage device (such as a magnetic or optical disk and its corresponding disk drive) as the permanent storage device 1735.

Other embodiments use a removable storage device (such as a floppy disk, flash memory device, etc., and its corresponding drive) as the permanent storage device. Like the permanent storage device 1735, the system memory 1720 is a read-and-write memory device. However, unlike storage device 1735, the system memory 1720 is a volatile read-and-write memory, such a random access memory. The system memory 1720 stores some of the instructions and data that the processor needs at runtime. In some embodiments, the invention's processes are stored in the system memory 1720, the permanent storage device 1735, and/or the read-only memory 1730. For example, the various memory units include instructions for processing multimedia clips in accordance with some embodiments. From these various memory units, the processing unit(s) 1710 retrieves instructions to execute and data to process in order to execute the processes of some embodiments.

The bus 1705 also connects to the input and output devices 1740 and 1745. The input devices 1740 enable the user to communicate information and select commands to the electronic system. The input devices 1740 include alphanumeric keyboards and pointing devices (also called "cursor control devices"), cameras (e.g., webcams), microphones or similar devices for receiving voice commands, etc. The output devices 1745 display images generated by the electronic system or otherwise output data. The output devices 1745 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 17, bus 1705 also couples electronic system 1700 to a network 1725 through a network adapter (not shown). In this manner, the computer can be a part of a network of computers (such as a local area network ("LAN"), a wide area network ("WAN"), or an Intranet, or a network of networks, such as the Internet. Any or all components of electronic system 1700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 11, 13, and 16) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for storing a document, the method comprising:

storing a content stream representation of the document comprising an ordered stream of code representations for primitive elements of the document, each code representation of a primitive element having an index that indicates the order in the content stream of the primitive element representation; and storing an object representation of the document comprising a set of object nodes arranged in a hierarchical tree structure that represents a hierarchical structure of the document, each object node referencing a range of indices in the content stream, wherein different document processing operations use the content stream and object representations differently.

2. The method of claim 1, wherein at least one of the content stream representation and the object representation is an in-memory representation for the document.

3. The method of claim 1, wherein at least one of the content stream representation and the object representation is a file format representation for the document.

4. The method of claim 1, wherein the code representations for the primitive elements are ordered based on a reading order of the primitive elements in the document.

5. The method of claim 1, wherein the range of indices referenced by any object node in the tree structure is a single contiguous range.

6. The method of claim 1, wherein the object nodes are arranged in the hierarchical tree structure with a first object node as a root object node that has no parent object nodes and each other object node having a single parent object node.

7. The method of claim 6, wherein the range of indices of any parent object node is the union of the ranges of indices of its child object nodes.

8. The method of claim 6, wherein the range of indices of any parent object node contains the union of the ranges of indices of its child object nodes.

9. The method of claim 6, wherein the ranges of indices for any two sibling object nodes are disjoint.

10. The method of claim 6, wherein when a first object node is a prior sibling of a second object node, the start index of the range of indices of the first object node is less than the start index of the range of indices of the second object node.

11. A method for storing a document, the method comprising:
    storing a content stream representation of the document comprising an ordered stream of code representations for primitive elements of the document, each code representation of a primitive element having an index that indicates the order in the content stream of the primitive element representation;
    storing a first object representation of the document comprising a set of object nodes arranged in a tree structure, each object node referencing a range of indices in the content stream; and
    storing a second, different object representation of the document comprising a second set of object nodes arranged in a second tree structure, each object node in the second object representation also referencing a range of indices in the content stream.

12. The method of claim 11, wherein the first object representation is a document structure representation in which the object nodes represent hierarchical document structures and the second object representation is a style property representation in which the object nodes represent style properties.

13. The method of claim 11, wherein the range of indices referenced by any object node in any tree structure is a single contiguous range within the content stream representation of the document.

14. A machine readable medium storing a program which when executed by at least one processing unit stores a document, the program comprising sets of instructions for:
    storing a content stream representation of the document comprising an ordered stream of code representations for primitive elements of the document, each code representation of a primitive element having an index that indicates the order in the content stream of the primitive element representation; and
    storing an object representation of the document comprising a set of object nodes arranged in a hierarchical tree structure that represents a hierarchical structure of the document, each object node referencing a range of indices in the content stream, wherein a particular document processing operation accesses a combination of the content stream and object stream representations for different types of information in order to efficiently perform its operation.

15. The machine readable medium of claim 14, wherein at least one of the content stream representation and the object representation is an in-memory representation for the document.

16. The machine readable medium of claim 14, wherein at least one of the content stream representation and the object representation is a file format representation for the document.

17. The machine readable medium of claim 14, wherein the code representations for the primitive elements are ordered based on a reading order of the primitive elements in the document.

18. The machine readable medium of claim 14, wherein the range of indices referenced by any object node in the tree structure is a single contiguous range.

19. The machine readable medium of claim 14, wherein the object nodes are arranged in the hierarchical tree structure with a first object node as a root object node that has no parent object nodes and each other object node having a single parent object node.

20. The machine readable medium of claim 19, wherein the range of indices of any parent object node is the union of the ranges of indices of its child object nodes.

21. The machine readable medium of claim 19, wherein the range of indices of any parent object node contains the union of the ranges of indices of its child object nodes.

22. A machine readable medium storing a program which when executed by at least one processing unit stores a document, the program comprising sets of instructions for:
    storing a content stream representation of the document comprising an ordered stream of code representations for primitive elements of the document, each code representation of a primitive element having an index that indicates the order in the content stream of the primitive element representation;
    storing a first object representation of the document comprising a set of object nodes arranged in a tree structure, each object node referencing a range of indices in the content stream; and
    storing a second, different object representation of the document comprising a second set of object nodes arranged in a second tree structure, each object node in the second object representation also referencing a range of indices in the content stream.

23. The machine readable medium of claim 22, wherein the first object representation is a document structure representation in which the object nodes represent hierarchical document structures and the second object representation is a style property representation in which the object nodes represent style properties.

24. The machine readable medium of claim 22, wherein a first set of document processing operations is performed using a combination of the first object representation and the content stream representation and a second set of document processing operations is performed using a combination of the second object representation and the content stream representation.

* * * * *